United States Patent [19]

Benedict et al.

[11] Patent Number: 5,185,558
[45] Date of Patent: * Feb. 9, 1993

[54] VEHICLE LIGHT, WINDSHIELD WIPER CONTROL SYSTEM

[75] Inventors: Charles E. Benedict, Tallahassee; Donald M. Stumpf, Panama City, both of Fla.

[73] Assignee: Benedict Engineering Company, Inc., Tallahassee, Fla.

[*] Notice: The portion of the term of this patent subsequent to Aug. 4, 2009 has been disclaimed.

[21] Appl. No.: 742,394

[22] Filed: Aug. 8, 1991

Related U.S. Application Data

[63] Continuation-in-part of Ser. No. 578,788, Sep. 7, 1990, which is a continuation-in-part of Ser. No. 409,612, Sep. 15, 1989, Pat. No. 4,056,562.

[51] Int. Cl.[5] .................... B60Q 1/02; H02G 3/00
[52] U.S. Cl. ........................ 315/80; 315/82; 315/83; 315/155; 307/10.8
[58] Field of Search ............... 315/77, 80, 82, 83, 315/155; 307/10.1, 10.8

[56] References Cited

U.S. PATENT DOCUMENTS

| | | |
|---|---|---|
| 3,500,119 | 3/1970 | Price . |
| 3,500,120 | 3/1970 | Schultz . |
| 3,519,837 | 7/1970 | Nolin et al. . |
| 3,591,845 | 7/1971 | Vanderpoel et al. . |
| 3,600,596 | 8/1971 | Aloisantoni . |
| 3,769,519 | 10/1973 | Adamian ............. 315/83 X |
| 3,824,405 | 7/1974 | Glaze . |
| 3,909,619 | 9/1975 | Kniesly et al. . |
| 4,057,742 | 11/1977 | Binegar . |
| 4,097,839 | 6/1978 | Lesiak . |
| 4,139,801 | 2/1979 | Linares . |
| 4,194,175 | 3/1980 | Eklund ............. 315/82 X |
| 4,236,099 | 11/1980 | Roseblum ............. 315/83 |
| 4,281,365 | 7/1981 | Elving et al. . |
| 4,301,390 | 11/1981 | Earle . |
| 4,337,400 | 6/1982 | Hahn ............. 307/10 LS |
| 4,355,271 | 10/1982 | Noack . |
| 4,656,363 | 4/1987 | Carter et al. . |
| 4,667,129 | 5/1987 | Papillon . |
| 4,859,867 | 8/1989 | Larson et al. ............. 307/10.1 |
| 4,956,562 | 9/1990 | Benedict et al. . |
| 4,985,660 | 1/1991 | Cronk . |

OTHER PUBLICATIONS

Texas Instruments TMS27C128 131 072-Bit UV Erasable Programmable Read-Only Memory TMS27PC128 131 072-Bit Programmable Read-Only Memory.
Texas Instruments TIBPAL16L8-30M, TIBPAL16-R4-30M, TIBPAL16R6-30M, TIBPAL16R8-30M TIBPAL16L8-25C, TIBPAL16R4-25C, TIBPAL16-R6-25C, TIBPAL16R8-25C Low-Power High-Performance Impact TM PAL ® Circuits.
Motorola Semiconductor Technical Data, High Side TMOS Driver PC33091 (Jun. 3, 1991).
Motorola Semiconductor Technical Data, TSMO E-FET Power Field Effect Transistor, MTP50N06E, 1989.
Elements of Computer Organization, by Langholz, Francioni & Kandel, © 1989, pp. 90–94.

*Primary Examiner*—Eugene R. LaRoche
*Assistant Examiner*—Son Dinh
*Attorney, Agent, or Firm*—Dowell & Dowell

[57] ABSTRACT

A vehicle's input switches relating to ignition, lights and moisture or rain provide responsive inputs that feed through a digital logic circuit to outputs of an electronic switching device for automatically activating the vehicle's lights and wipers.

An alarm may be activated if certain input switches are turned on when the ignition is off.

The digital logic circuit may be discrete, a programmable read only memory (PROM) or a programmable logic array (PLA).

The electronic switching device may constitute a driver circuit and an integrated circuit which includes both a relay switching circuit and a switched circuit, for example a metal-oxide-semiconductor (MOS) driver and a power metal-oxide-semiconductor field-effect-transistor (MOSFET) integrated circuit.

25 Claims, 27 Drawing Sheets

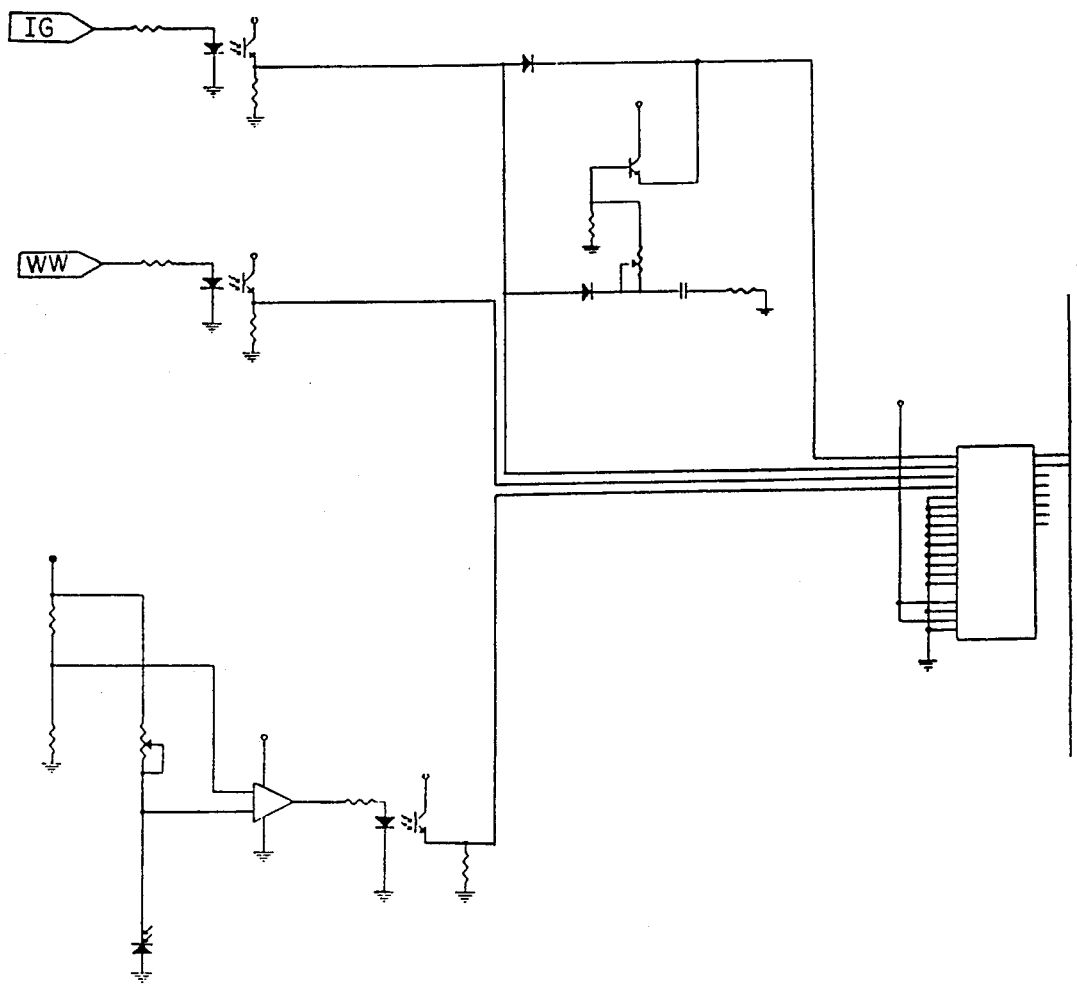
FIG. IIA

VEHICLE LIGHT, WINDSHIELD WIPER CONTROL SYSTEM

CROSS-REFERENCE TO RELATED APPLICATIONS

This application is a continuation-in-part of application Ser. No. 07/578,788 filed Sep. 7, 1990 which is a continuation-in-part of application Ser. No. 07/409,612 filed Sep. 15, 1989 entitled HEADLIGHT, WINDSHIELD WIPER CONTROL SYSTEM, now U.S. Pat. No. 4,056,562.

BACKGROUND OF THE INVENTION

1. Field of the Invention

This invention relates to an electronic system for controlling the turning on and off of the headlights and parking lights, and optionally, the windshield wipers, in conjunction with the operation of the ignition switch, windshield wipers, light sensor and moisture sensor switches of a vehicle.

2. History of the Related Art

The turning on of the headlights of a vehicle during poor visibility conditions is a safety measure. In some states the law requires that when the windshield wipers are turned on, such as during rain conditions, the headlights must also be turned on. Federal regulations now require that when the headlights are continuously activated the parking lights and other running lights must also be activated. This is provided for in the factory installed wiring of recent model vehicles.

Systems for automatically turning on the headlights when the windshield wipers are turned on have been known in the prior art. For example, in U.S. Pat. No. 4,656,363, to Carter et al. and Rosenblum U.S. Pat. No. 4,236,099 a transistor circuit is employed to turn the vehicle headlights on and off when the windshield wipers are turned on and off.

Other United States patents which disclose similar or related systems are Price U.S. Pat. No. 3,500,119, Schultz U.S. Pat. No. 3,500,120, Nolin et al. U.S. Pat. No. 3,519,837, Vanderpoel U.S. Pat. No. 3,591,845, Aloisantoni U.S. Pat. No. 3,600,596, Glaze U.S. Pat. No. 3,824,405, Binegar U.S. Pat. No. 4,057,742 and Lesiac U.S. Pat. No. 4,097,839.

Other United States patents disclosing wiper control headlight devices are Earle U.S. Pat. No. 4,301,390, Hahn U.S. Pat. No. 4,337,400, Kniesly et al. U.S. Pat. No. 3,909,619, Papillon U.S. Pat. No. 4,667,129 and Cronk U.S. Pat. No. 4,985,660.

The U.S. Pat. No. 4,656,363 to Larson et al. discloses a moisture sensor control for turning on the windshield wipers.

The U.S. Pat. No. 4,355,271 to Noack discloses controls for turning on a windshield washer when dust is detected.

The U.S. Pat. No. 3,769,519 to Adamian discloses an automatic control for the headlights responsive to ambient light levels.

The U.S. Pat. No. 4,281,365 to Elving et al. discloses an illumination control device including a time delay circuit.

The U.S. Pat. No. 4,139,801 to Linares discloses an automatic light control having a water cell circuit for controlling the headlights and windshield wipers.

SUMMARY OF THE INVENTION

It is an object of the invention to provide an automatic switching means for controlling the activation of the external running lights of a vehicle and, optionally, its windshield wipers and an alarm, in response to activation of the vehicle's input switches which may include ignition, parking lights, headlights, windshield wipers, moisture sensor, and light sensor, in which the input circuits are connected through a digital logic circuit to electronic switching means for the output circuits, thereby providing a high level of reliability and safety.

It is a further object of the invention to provide an automatic switching means for controlling the external running lights of a vehicle in response to inputs from switches for the ignition, parking lights, headlights, windshield wipers, moisture sensor and light sensor, or selected combinations thereof, in which a fully digital logic circuit is employed for connecting the inputs to an electronic switching means for the outputs, in which the digital logic circuit may be discrete, or programmable, including a microchip PROM, or PLA, and in which the electronic switching means may comprise a MOS driver for a power MOSFET, thereby providing a circuit which not only has a high level of reliability and safety but also is compact, relatively easy to assemble, and therefore less expensive.

It is a further object of the invention to provide an automatic switching means for controlling the activation of the external running lights of a vehicle and optionally the windshield wipers and an alarm, in response to inputs from switches for the ignition, parking lights, headlights, windshield wipers, moisture sensor and light sensor, or selected combinations thereof, in which a digital logic circuit connects the input signals to output circuits, the output circuit including an electronic switching means which comprises a driver circuit and an electronic relay circuit, in which a regulated power supply is connected to the output circuits, in order to provide a high level of reliability and safety.

It is a further object of the invention to provide an automatic switching means for controlling the activation of the external running lights of a vehicle and optionally the windshield wipers and an alarm, in which the vehicle has input switches for the ignition, parking lights, headlights, windshield wipers, moisture sensor and light sensor and in which inputs from these switches or any selected combination thereof is connected through a digital logic circuit to output circuits comprising electronic switching means, and in which the digital logic circuit has latching circuits connected to the electronic switching means, thereby providing a high level of reliability and safety.

BRIEF DESCRIPTION OF THE DRAWINGS

FIGS. 11a and 11b are (A, and B) a schematic similar to FIGS. 10a and 10b in which the digital logic circuit is a PROM.

DESCRIPTION OF A PREFERRED EMBODIMENT

GENERAL OVERVIEW

Figure 1A:
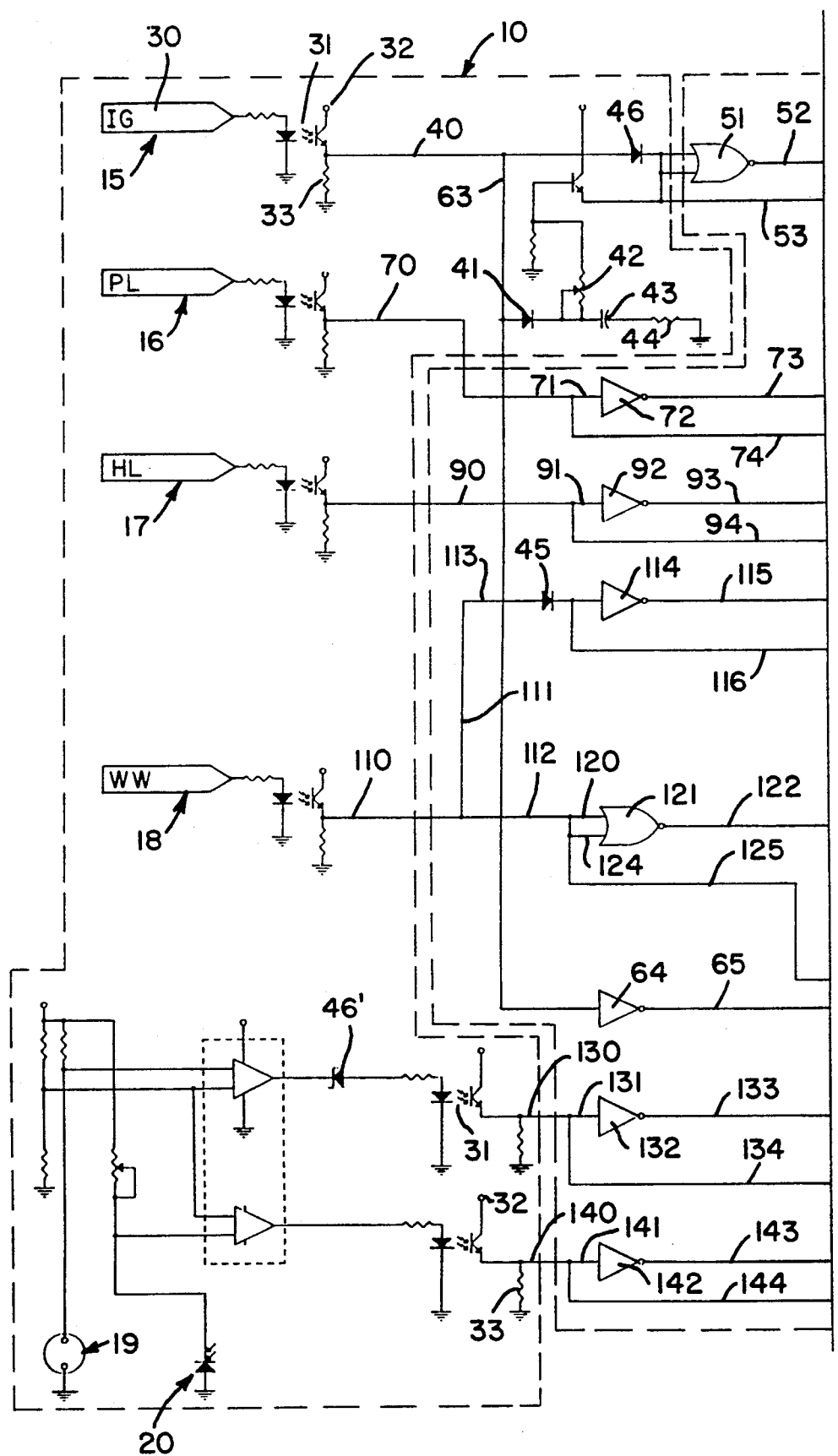
FIGS. 1a, 1b and 1c are a (A, B, and C) schematic of a preferred form of the invention in which the inputs are ignition, parking lights, headlights, windshield wipers, moisture sensor and light sensor, and the outputs are headlights, parking lights, windshield wipers, and an alarm, and a discrete digital logic circuit is employed.

One of the objects of the invention is a control system that may be installed at the factory where a vehicle is manufactured or, an after market version, that may be connected to a vehicle after its manufacture. The after market version has input terminals that are connectable to the outputs of the existing switches in the vehicle.

As used in this application the term "switch" may refer either to a switch of a vehicle or to the terminal of a system which is connectable to a designated vehicle switch.

The automatic switching control system of the invention may be described in four sections: an input section 10, a voltage regulator section 11, a digital logic section 12, and an output section 13.

The input section includes input terminals 15 from the ignition switch, parking lights 16, headlights 17, windshield wipers 18, a moisture sensor 19, and light sensor 20. The terminals are connected to vehicle switches installed when the vehicle is manufactured or later.

There are outputs to the headlights 21, parking lights 22, windshield wipers 23, and an alarm 24.

For convenient reference, this embodiment is referred to as the 6/4, having six inputs and four outputs.

Separate embodiments include discrete digital logic, and programmable digital logic, particularly PROM and PLA (to be described).

THE INPUTS

Each of the inputs 15-18 includes a manual switch 30, an opto-isolator 31, a direct current supply 32, and a grounded protective resistor 33. The moisture sensor and light sensor switches 19 and 20 have opto-isolators 31, power supplies 32, and grounded protective resistors 33.

THE DISCRETE DIGITAL LOGIC CIRCUITRY

From the ignition 15 the output line 40 feeds through diode 41 to an RC circuit, including adjustable resistor 42, capacitor 43, and resistor 44 to ground, in order to provide a built-in adjustable delay to turn off the headlights after the ignition is turned off. Diode 41 permits current flow only in one direction. Line 40 also feeds through one way diode 46 to NOR gate 51 having an output line 52, whose function will be described later, and to a main line 53 to an ignition switch trunk line 54.

The ignition switch trunk line 54 has a branch line 55 to AND gate 56, a branch line 57 to AND gate 58, a branch line 59 to AND gate 60, and a branch line 61 to AND gate 62. A separate branch 63 is connected to inverter 64, for a purpose to be described.

The output 70 from the parking light switch has a line 71 to inverter 72 having an outlet 73 whose function will be described later. The primary outlet 74 from the line 70 feeds to a parking light trunk line 75. Trunk line 75 has a branch 78 to OR gate 79 and a branch 80 to AND gate 81.

The headlights output line 90 has a line 91 to inverter 92 having an outlet line 93 whose purpose will be described later. The main line 94 from the line 90 is connected to a headlight trunk line 95. Trunk line 95 has a branch line 96 to OR gate 97 and a branch line 98 to AND gate 99.

The windshield wiper switch 18 has an outlet line 110 with branches 111 and 112. The branch 111 feeds to line 113 through diode 45 to inverter 114 to outlet line 115 whose purpose will be described later. The primary outlet line from line 113 feeds to line 116 to windshield wiper trunk line 117. Line 117 has a branch 118 to the AND gate 56. Diode 45 has a purpose similar to that of diode 41.

Branch line 112 from the windshield wiper switch 18 feeds to line 120 to the NOR gate 121 having an outlet 122 to the AND gate 123. Line 112 also has a branch 124 that feeds to the NOR gate 121 and a main line 125 that feeds to the AND gate 62.

The moisture sensor feeds through diode 46' which permits current flow only when the voltage is sufficiently high and has an outlet line 130 that feeds to a line 131 to the inverter 132 having an outlet 133 whose purpose will be described later. The other line 134 from line 130 feeds to the moisture sensor trunk line 135. Line 135 has a branch 136 to AND gate 77, a branch line 137 to AND gate 58, and a third branch line 138 to AND gate 139.

The light sensor has an outlet 140 to line 141 to inverter 142 having an outlet 143 whose purpose will be described later. Line 140 also feeds line 144 to the light sensor trunk line 145. Line 145 has a branch 146 to the AND gate 77 and a branch 147 to the AND gate 60.

INVERTED OUTPUTS

Ignition NOR gate output 52 feeds to trunk line 150 having branch 151 to AND gate 152, branch 153 to AND gate 154, and branch 155 to AND gate 156.

Ignition inverter 64 from line 63 has an outlet 65 to trunk line 200 having branch 201 to AND gate 99 and branch 202 to AND gate 81, both gates in the circuit to alarm 24. Branch 157 from 201 feeds to OR gate 158.

Parking lights inverter output 73 feeds to trunk line 160 and branch 162 to AND gate 164.

Headlights inverter output 93 feeds to trunk line 170 having branch 171 to AND gate 172, branch 173 to AND gate 152, branch 172' to AND gate 154, and branch 176 to AND gate 164.

Windshield wiper inverter output 115, previously mentioned, feeds to trunk line 180 having branch 181 to AND gate 172 and branch 182 to AND gate 164.

Windshield wiper NOR gate output line 122 is connected to AND gate 123, as previously described.

Moisture sensor inverter line 133 feeds to trunk line 210 having a branch 211 to AND gate 172, branch 213 to AND gate 214, and branch 215 to AND gate 123.

Light sensor inverter line 143 feeds to trunk line 220 having a branch 221 to AND gate 222, branch 223 to AND gate 156, and branch 224 to AND gate 214.

CONTINUATION OF LOGIC CIRCUITRY

Beginning at the top of FIG. 1, AND gate 77 feeds to OR gate 230 which receives another input from OR gate 97 and feeds to NOR gate 232.

AND gate 56 feeds to OR gate 236 which receives another input from AND gate 58 and feeds to OR gate 238 which feeds to OR gate 97, the other input coming from branch line 96.

OR gate 79 receives one input from OR gate 97 and the other from branch line 78 and feeds to NOR gate 239.

AND gate 60 feeds to OR gate 238.

AND gate 172 feeds to AND gate 222 whose other input is branch 221. AND gate 222 feeds to OR gate 240 whose other input is OR gate 242. Gate 242 receives inputs from AND gates 152, 154, and 156. OR gate 240 feeds to NOR gate 244 which is in latching relationship with NOR gate 232.

AND gate 152 also feeds to OR gate 248 which receives its other input from AND gate 250 whose inputs are the AND gates 164 and 214. OR gate 248 feeds to NOR gate 248' which is in latching relationship with NOR gate 239.

AND gate 158 feeds to NOR gate 260.

AND gates 139 and 62 feed to OR gate 262 which feeds to NOR gate 264 which is in latching relationship with NOR gate 260.

AND gates 99 and 81 feed OR gate 266 whose output is to alarm 24 through current limiting resistor 25.

THE OUTPUTS

The outputs include the switches 21, 22 and 23 for the headlights, parking lights and windshield wipers, respectively, and the alarm 24. The first three are connected by similar elements to the logic circuitry.

Thus, output line 270 from gate 244 extends to pin 271 of MOS (metal-oxide-semiconductor) driver 272. This is preferably a high side TMOS driver designed to drive N-channel TMOS devices. An example of a commercially available device is Motorola PC 33091. Line 273 is connected to gate lead 274 of power MOSFET 275 having source and drain connections 276 and 277, connection 276 connected to headlight switch 21 by line 278. MOSFET 275 may be a Motorola product identified as MTP50N06E, and further described as a Power Field Effect Transistor, N-Channel Enhancement-Mode Silicon Gate. Line 279 from the battery is connected through voltage divider resistor 280 to pin 281 of driver 272 and to line 277 of MOSFET 275.

Output line 282 from gate 232 is connected to transistor 283 whose collector is connected to line 284 to lines 273 and 274.

A high output on line 270 turns the headlights on. A high output on line 282 turns them off.

The outputs from NOR gates 232 and 244 are fed through current limiting resistors.

The high side driver 272 not only turns the MOSFET gate 275 off and on but also senses the amount of current flowing through the gate and turns it off for a predetermined length of time to avoid overload to the lights; it further causes the headlights to blink to indicate a problem. Thus, a conventional RC timer circuit 269 is connected to one of the pins of driver 272 and a transient suppression resistor 268 is connected in the line to lines 276 and 278. The driver 272 monitors the current and causes the headlights to blink, intermittently turning off the gate 275, as a warning, if the current is excessive.

The outputs 283', 285 from paired gates 239, 248, and 287, 289 from gates 264, 260 are of similar nature to that from gates 232, 244, and control the current flow to the MOS drivers 286, 288, and to the power MOSFETS 290, 292, respectively, to the parking lights and windshield wipers.

The output to the alarm 24 is connected to inputs, including the headlights 17 and the inverted output from the ignition 15, from gate 99. The other input is connected to the parking lights input 16, and the inverted output from the ignition. Thus, the alarm sounds immediately if the headlights or parking light switch is on after the ignition is turned off.

VOLTAGE REGULATOR

The voltage regulator 11 is for the purpose of regulating the voltage from the vehicle battery to the power MOSFETS in order to prevent transient damage to these components, and to provide the required voltages to the PROM and PLA. The voltage regulator includes a voltage regulator diode 293, and capacitors 294, 295, current limiting resistor 296, and transient suppressor diode 297.

MODIFICATION WITH PROGRAMMABLE READ-ONLY MEMORY

FIG. 2 illustrates a modification in which the inputs and outputs are similar to those of FIG. 1 but in which, instead of using the discrete digital logic circuit of FIG. 1, a PROM (programmable read-only memory) digital logic chip 310 is substituted.

The inputs 15-20 are the same and have the primary output lines 40, 70, 90, 110, 134 and 144 the same as in FIG. 1. Branch line 63 from the ignition 15 is also employed. No inverted outputs are required as in FIG. 1 as the PROM chip is capable of using uninverted outputs. Line outputs 301-306 extend from the chip corresponding to the output for the headlights, parking lights and windshield wipers and the line 307 for the alarm. These include main lines 302, 304, and 306 to the drivers 272, 296, and 288 and branch lines 301, 303, and 305 to the transistor 283.

The PROM chip 310 is a programmable read-only memory circuit chip of a type produced by Texas Instruments. These are further described as electrically programmable read-only memories, examples being identified as TMS27C128072 BITUV and TMS27PC128 131072-BIT PROMS.

MODIFICATION EMPLOYING A PROGRAMMABLE LOGIC ARRAY DEVICE

Figure 1B:
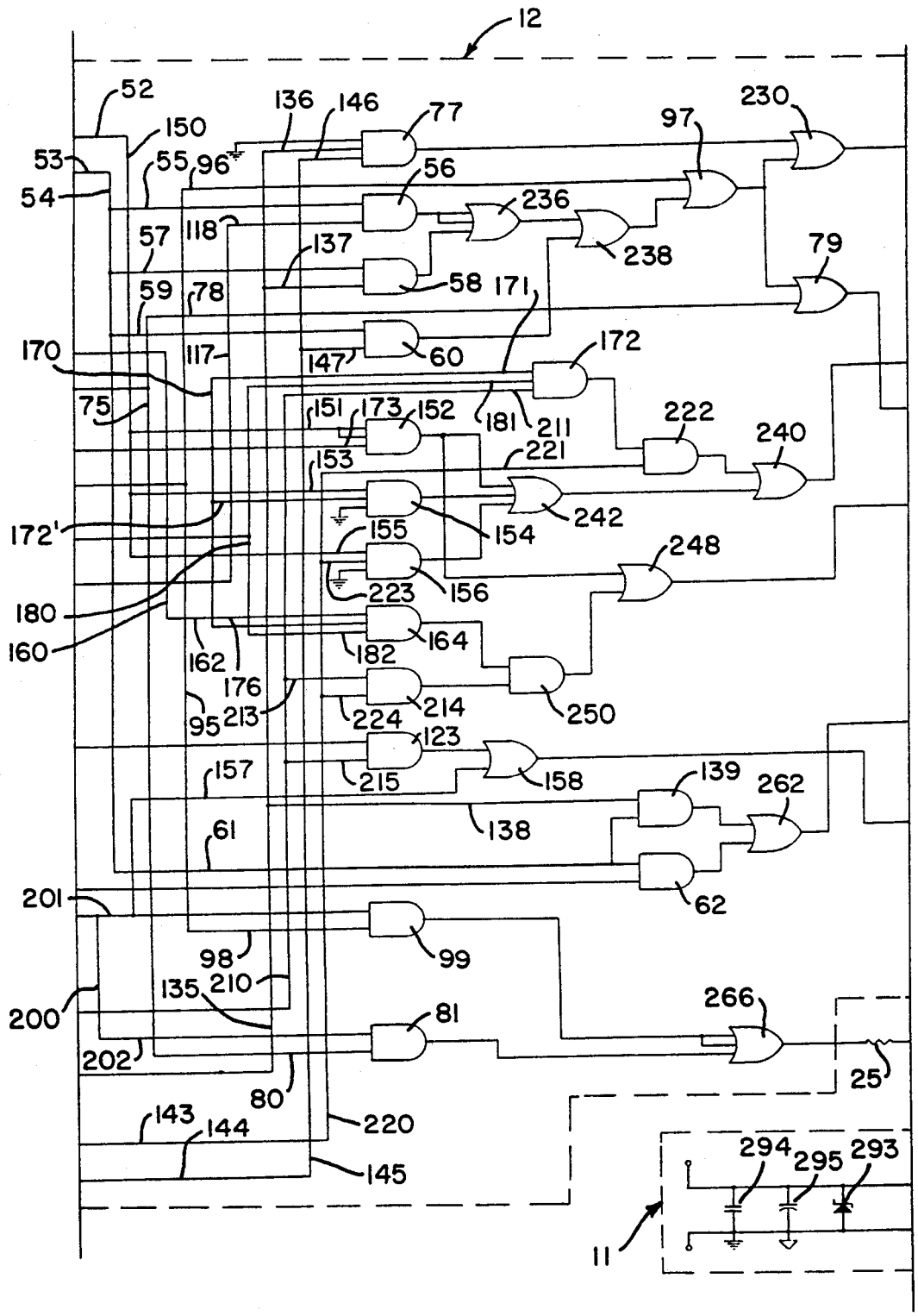
Figure 1C:
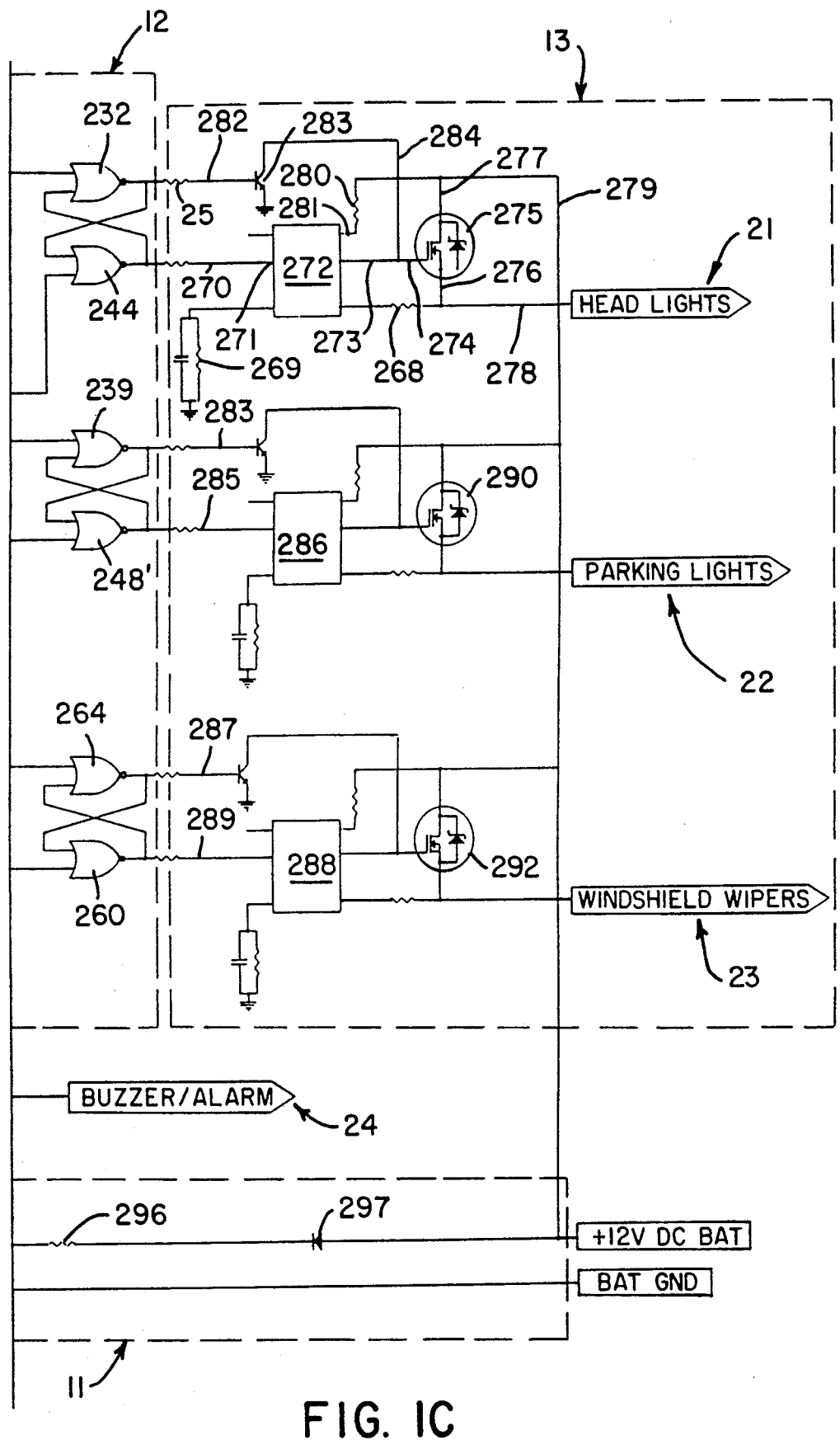

This modification, illustrated in FIG. 3, employs the same inputs and outputs as FIG. 1, but substitutes a PLA (programmable logic array) digital logic device in place of the discrete digital logic of FIGS. 1a, 1b and 1c.

Figure 2A:
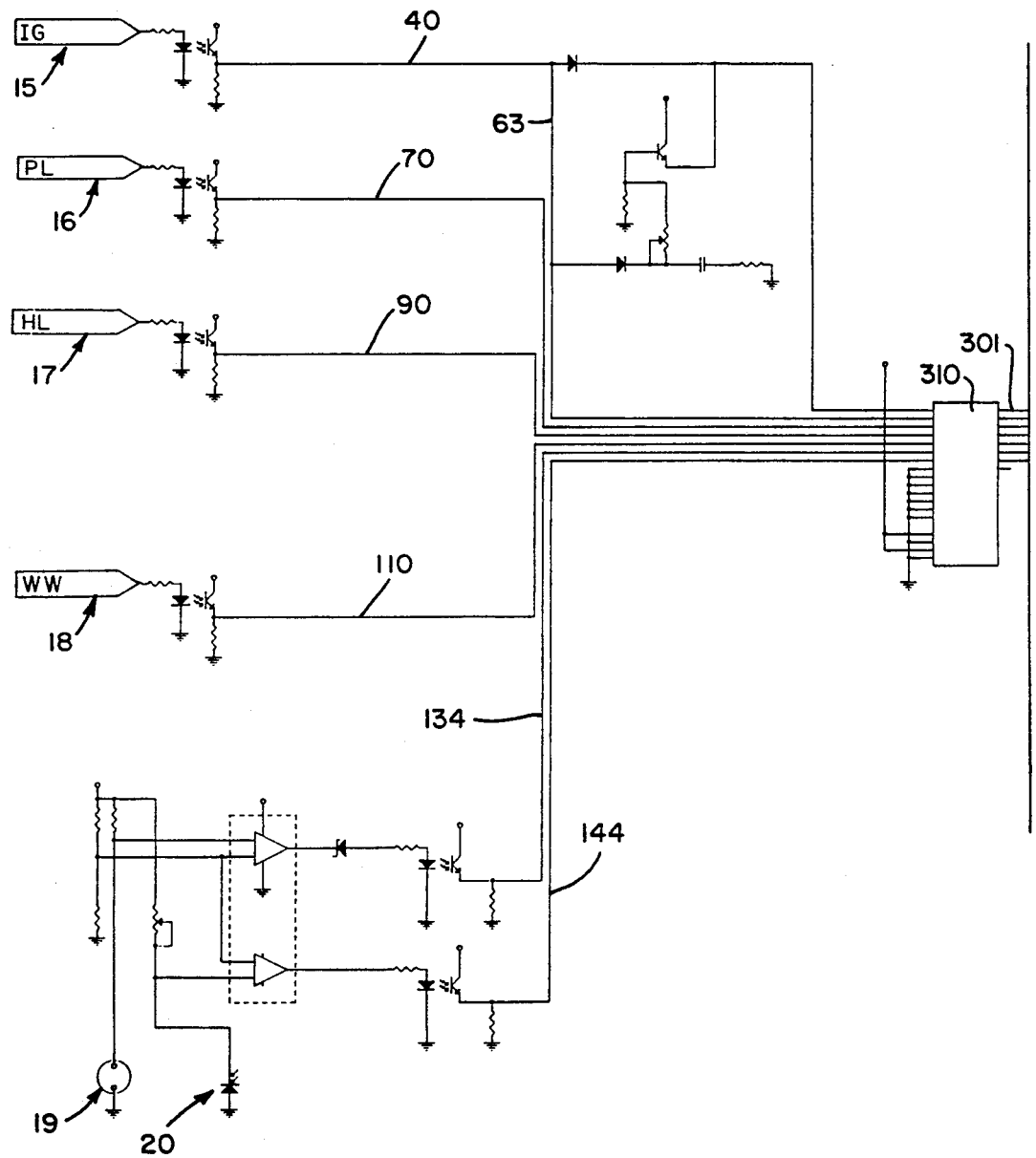
FIGS. 2a and 2b are (A, and B) a schematic similar to FIGS. 1a, 1b and 1c in which the digital logic circuit comprises a PROM.
Figure 2B:
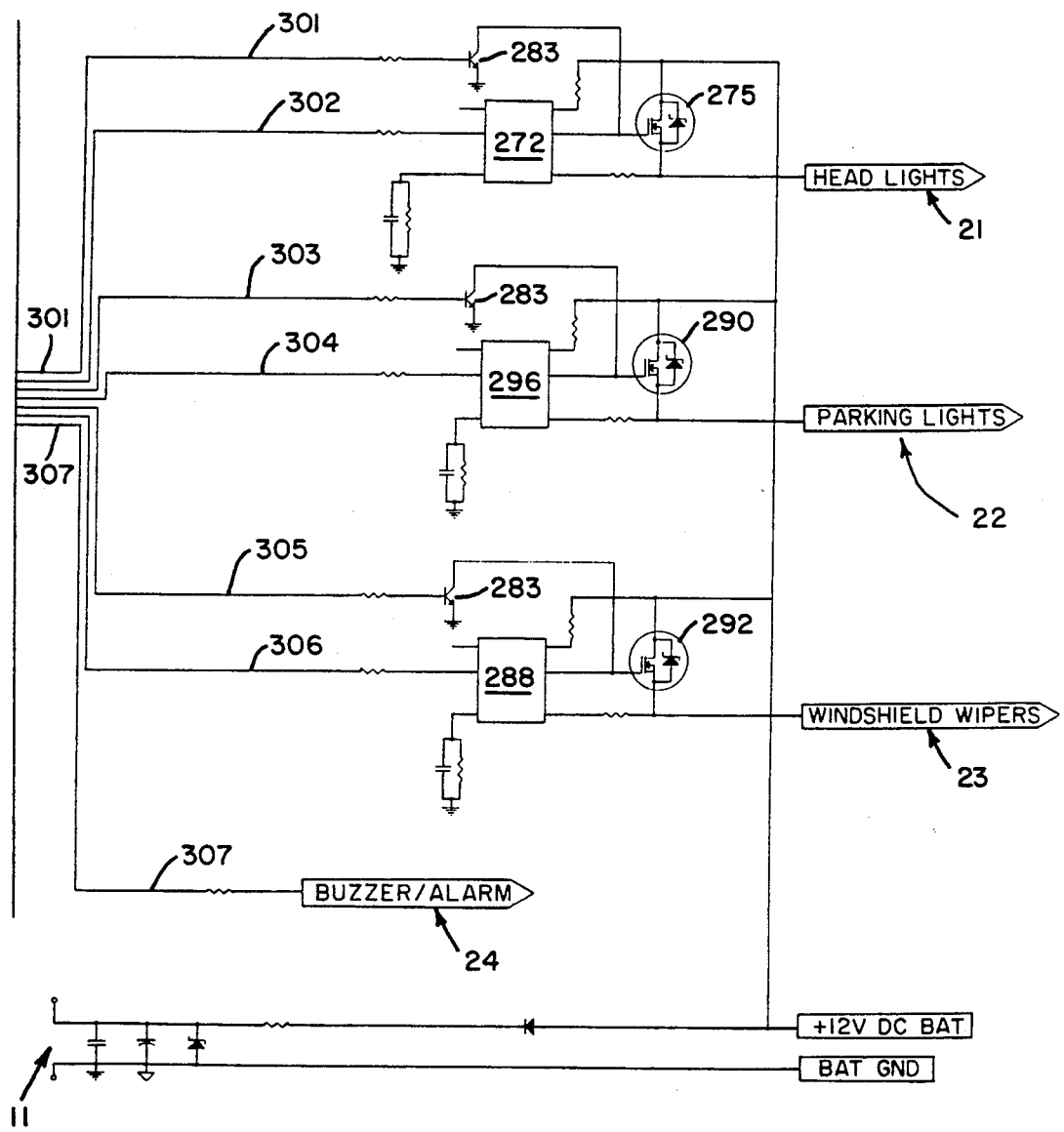
Figure 3A:
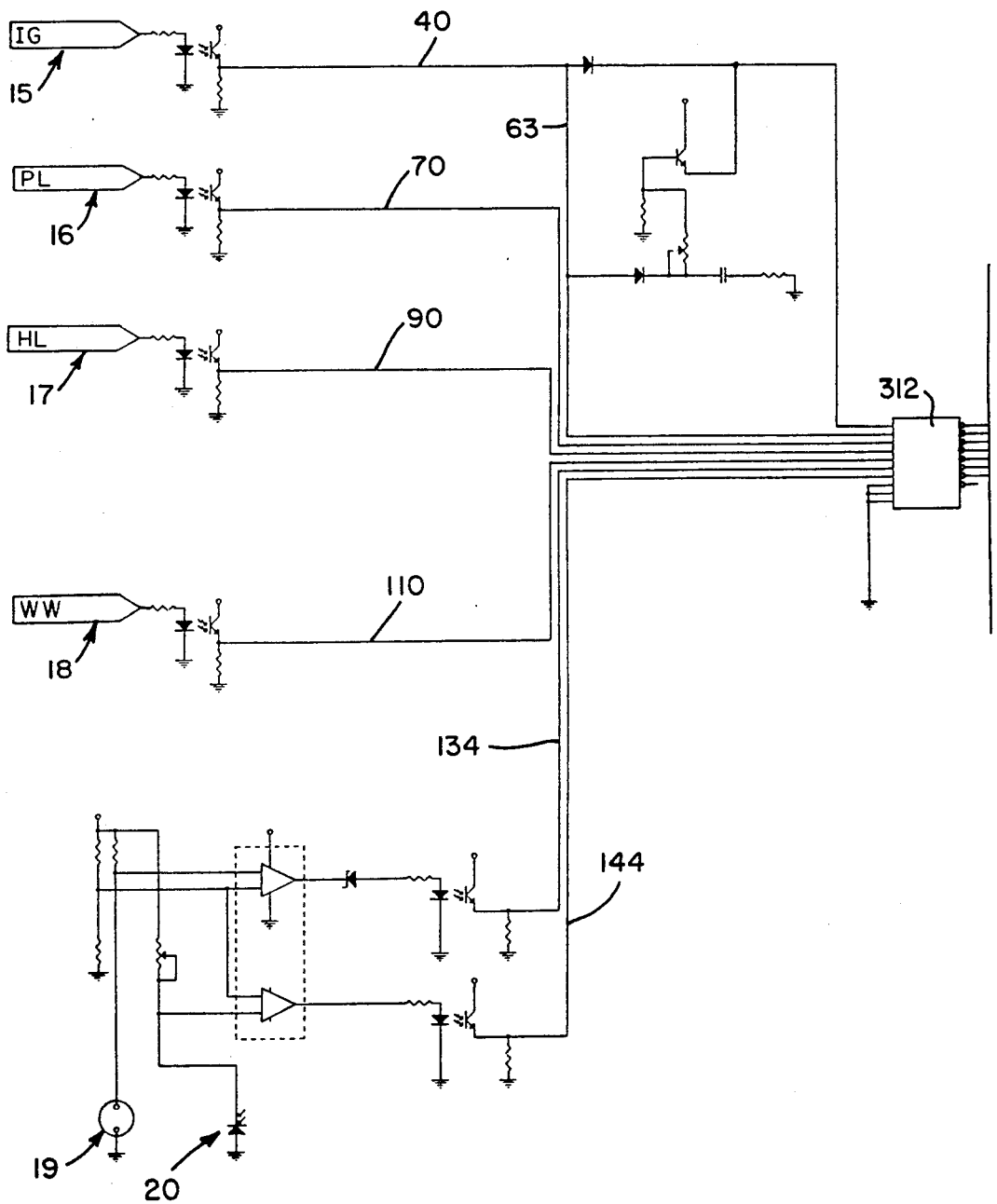
FIGS. 3a and 3b are (A, and B) a schematic similar to FIGS. 1a, 1b and 1c in which the digital logic circuit comprises a PLA.
Figure 3B:
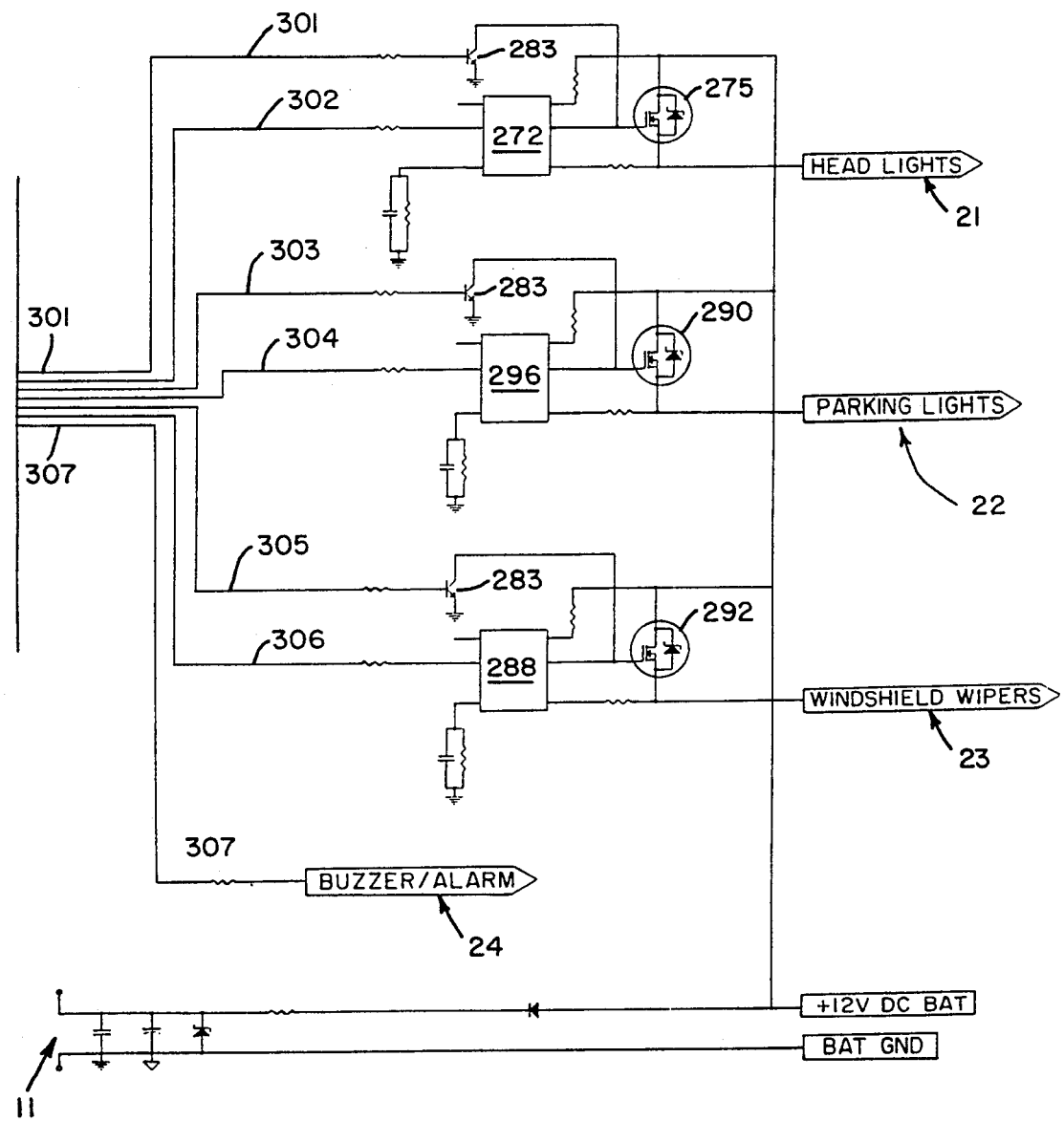

In the modification of FIGS. 3a and 3b, the input lines are the same as in FIGS. 2a and 2b. This is also true of the output lines.

Thus, the only difference between FIGS. 2a and 2b and 3a and 3b is in the use in FIG. 3 of a programmable logic array device 312.

A PLA functions like a PROM but differs in that the PLA does not generate all the miniterms of the input variables. Instead, the decoder of the PROM is replaced in the PLA by an AND gate array that can be programmed to produce only selected product terms.

For example, this device may be of the type produced by Texas Instruments Company under the designations TIBPAL16L8-30M, TIBPAL16L8-25C, LOW-POWER HIGH-PERFORMANCE IMPACT T-M PAL® CIRCUITS. They are further described as combining Advanced Low-Power Schottky technology with proven titanium-tungsten fuses and will provide reliable high performance substitutes for conventional TTL logic.

A Truth Table, Table I, for FIGS. 1a, 1b, 1c, 2a, 2b, and 3a, and 3b is as follows:

TABLE I
TRUTH TABLE
6 INPUTS, 4 OUTPUTS

| INPUTS | | | | | | OUTPUTS | | | |
|---|---|---|---|---|---|---|---|---|---|
| IG | PL | HL | WW | MS | LS | PL | HL | BZ | WW |
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 1 | 0 | 0 | 0 | 0 | 0 |
| 0 | 0 | 0 | 0 | 1 | 1 | 0 | 0 | 0 | 0 |
| 0 | 0 | 0 | 1 | 0 | 0 | 0 | 0 | 0 | 0 |
| 0 | 0 | 0 | 1 | 0 | 1 | 0 | 0 | 0 | 0 |
| 0 | 0 | 0 | 1 | 1 | 0 | 0 | 0 | 0 | 0 |
| 0 | 0 | 0 | 1 | 1 | 1 | 0 | 0 | 0 | 0 |
| 0 | 0 | 1 | 0 | 0 | 0 | 1 | 1 | 1 | 0 |
| 0 | 0 | 1 | 0 | 0 | 1 | 1 | 1 | 1 | 0 |
| 0 | 0 | 1 | 0 | 1 | 0 | 1 | 1 | 1 | 0 |
| 0 | 0 | 1 | 0 | 1 | 1 | 1 | 1 | 1 | 0 |
| 0 | 0 | 1 | 1 | 0 | 0 | 1 | 1 | 1 | 0 |
| 0 | 0 | 1 | 1 | 0 | 1 | 1 | 1 | 1 | 0 |
| 0 | 0 | 1 | 1 | 1 | 0 | 1 | 1 | 1 | 0 |
| 0 | 0 | 1 | 1 | 1 | 1 | 1 | 1 | 1 | 0 |
| 0 | 1 | 0 | 0 | 0 | 0 | 1 | 0 | 1 | 0 |
| 0 | 1 | 0 | 0 | 0 | 1 | 1 | 0 | 1 | 0 |
| 0 | 1 | 0 | 0 | 1 | 0 | 1 | 0 | 1 | 0 |
| 0 | 1 | 0 | 0 | 1 | 1 | 1 | 0 | 1 | 0 |
| 0 | 1 | 0 | 1 | 0 | 0 | 1 | 0 | 1 | 0 |
| 0 | 1 | 0 | 1 | 0 | 1 | 1 | 0 | 1 | 0 |
| 0 | 1 | 0 | 1 | 1 | 0 | 1 | 0 | 1 | 0 |
| 0 | 1 | 0 | 1 | 1 | 1 | 1 | 0 | 1 | 0 |
| 0 | 1 | 1 | 0 | 0 | 0 | 1 | 1 | 1 | 0 |
| 0 | 1 | 1 | 0 | 0 | 1 | 1 | 1 | 1 | 0 |
| 0 | 1 | 1 | 0 | 1 | 0 | 1 | 1 | 1 | 0 |
| 0 | 1 | 1 | 0 | 1 | 1 | 1 | 1 | 1 | 0 |
| 0 | 1 | 1 | 1 | 0 | 0 | 1 | 1 | 1 | 0 |
| 0 | 1 | 1 | 1 | 0 | 1 | 1 | 1 | 1 | 0 |
| 0 | 1 | 1 | 1 | 1 | 0 | 1 | 1 | 1 | 0 |
| 0 | 1 | 1 | 1 | 1 | 1 | 1 | 1 | 1 | 0 |
| 1 | 0 | 0 | 0 | 0 | 0 | 0 | 0 | 0 | 0 |
| 1 | 0 | 0 | 0 | 0 | 1 | 1 | 1 | 0 | 0 |
| 1 | 0 | 0 | 0 | 1 | 0 | 1 | 0 | 0 | 1 |
| 1 | 0 | 0 | 0 | 1 | 1 | 1 | 0 | 0 | 1 |
| 1 | 0 | 0 | 1 | 0 | 0 | 1 | 0 | 0 | 1 |
| 1 | 0 | 0 | 1 | 0 | 1 | 1 | 0 | 0 | 1 |
| 1 | 0 | 0 | 1 | 1 | 0 | 1 | 0 | 0 | 1 |
| 1 | 0 | 1 | 0 | 0 | 0 | 1 | 1 | 0 | 0 |
| 1 | 0 | 1 | 0 | 0 | 1 | 1 | 1 | 0 | 0 |
| 1 | 0 | 1 | 0 | 1 | 0 | 1 | 1 | 0 | 1 |
| 1 | 0 | 1 | 0 | 1 | 1 | 1 | 1 | 0 | 1 |
| 1 | 0 | 1 | 1 | 0 | 0 | 1 | 1 | 0 | 1 |
| 1 | 0 | 1 | 1 | 0 | 1 | 1 | 1 | 0 | 1 |
| 1 | 0 | 1 | 1 | 1 | 0 | 1 | 1 | 0 | 1 |
| 1 | 0 | 1 | 1 | 1 | 1 | 1 | 1 | 0 | 1 |
| 1 | 1 | 0 | 0 | 0 | 0 | 1 | 0 | 0 | 0 |
| 1 | 1 | 0 | 0 | 0 | 1 | 1 | 1 | 0 | 0 |
| 1 | 1 | 0 | 0 | 1 | 0 | 1 | 1 | 0 | 1 |
| 1 | 1 | 0 | 0 | 1 | 1 | 1 | 1 | 0 | 1 |
| 1 | 1 | 0 | 1 | 0 | 0 | 1 | 1 | 0 | 1 |
| 1 | 1 | 0 | 1 | 0 | 1 | 1 | 1 | 0 | 1 |
| 1 | 1 | 0 | 1 | 1 | 0 | 1 | 1 | 0 | 1 |
| 1 | 1 | 0 | 1 | 1 | 1 | 1 | 1 | 0 | 1 |
| 1 | 1 | 1 | 0 | 0 | 0 | 1 | 1 | 0 | 0 |
| 1 | 1 | 1 | 0 | 0 | 1 | 1 | 1 | 0 | 0 |
| 1 | 1 | 1 | 0 | 1 | 0 | 1 | 1 | 0 | 1 |
| 1 | 1 | 1 | 0 | 1 | 1 | 1 | 1 | 0 | 1 |
| 1 | 1 | 1 | 1 | 0 | 0 | 1 | 1 | 0 | 1 |
| 1 | 1 | 1 | 1 | 0 | 1 | 1 | 1 | 0 | 1 |
| 1 | 1 | 1 | 1 | 1 | 0 | 1 | 1 | 0 | 1 |
| 1 | 1 | 1 | 1 | 1 | 1 | 1 | 1 | 0 | 1 |

MODIFICATION WITH SIX INPUTS AND THREE OUTPUTS

Figure 4A:
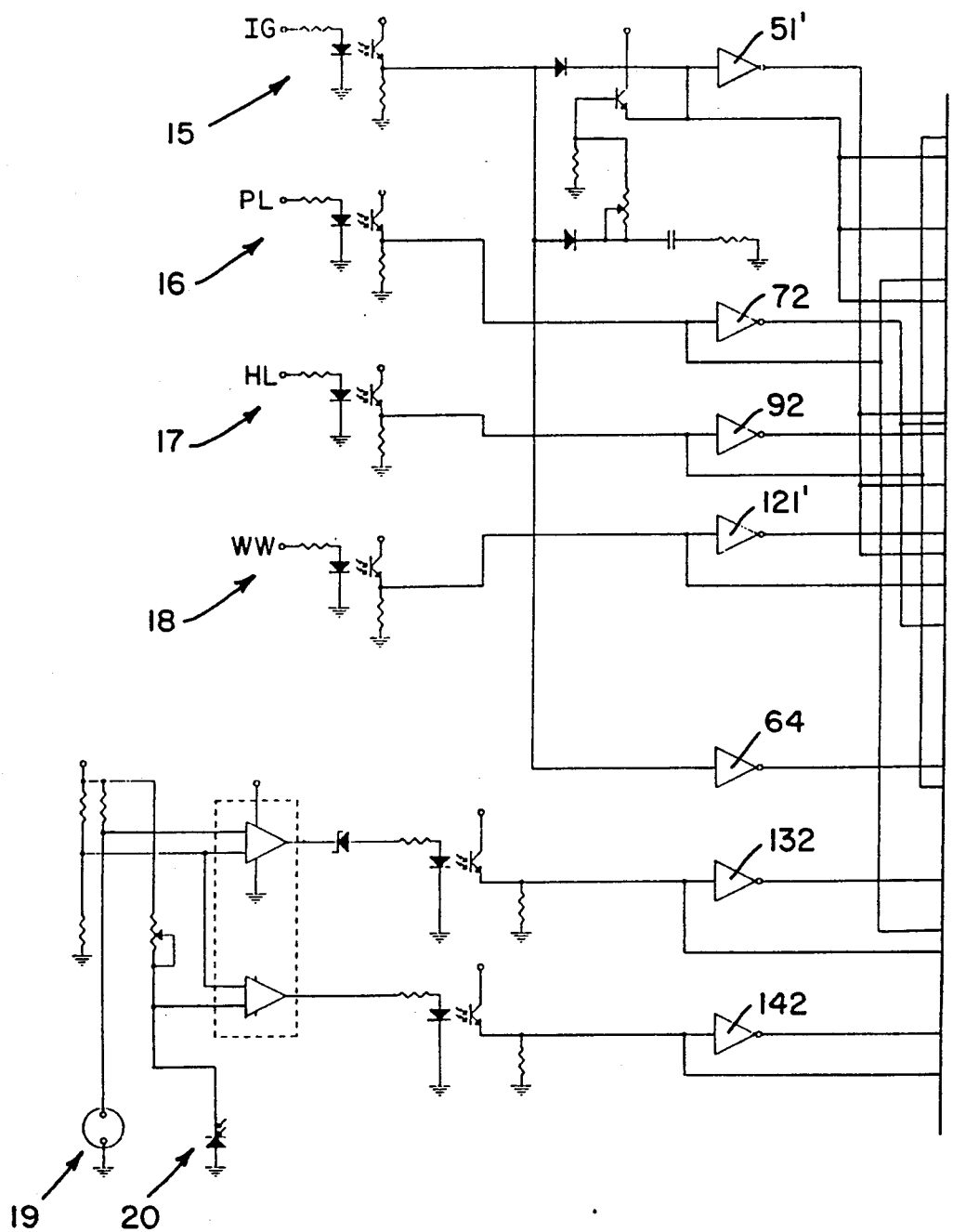
FIGS. 4a, 4b and 4c are (A, B and C) a schematic of a modification having the same inputs as in FIGS. 1a, 1b and 1c, and in which the outputs are headlights, parking lights and an alarm, and connected by a discrete digital logic circuit.
Figure 4B:
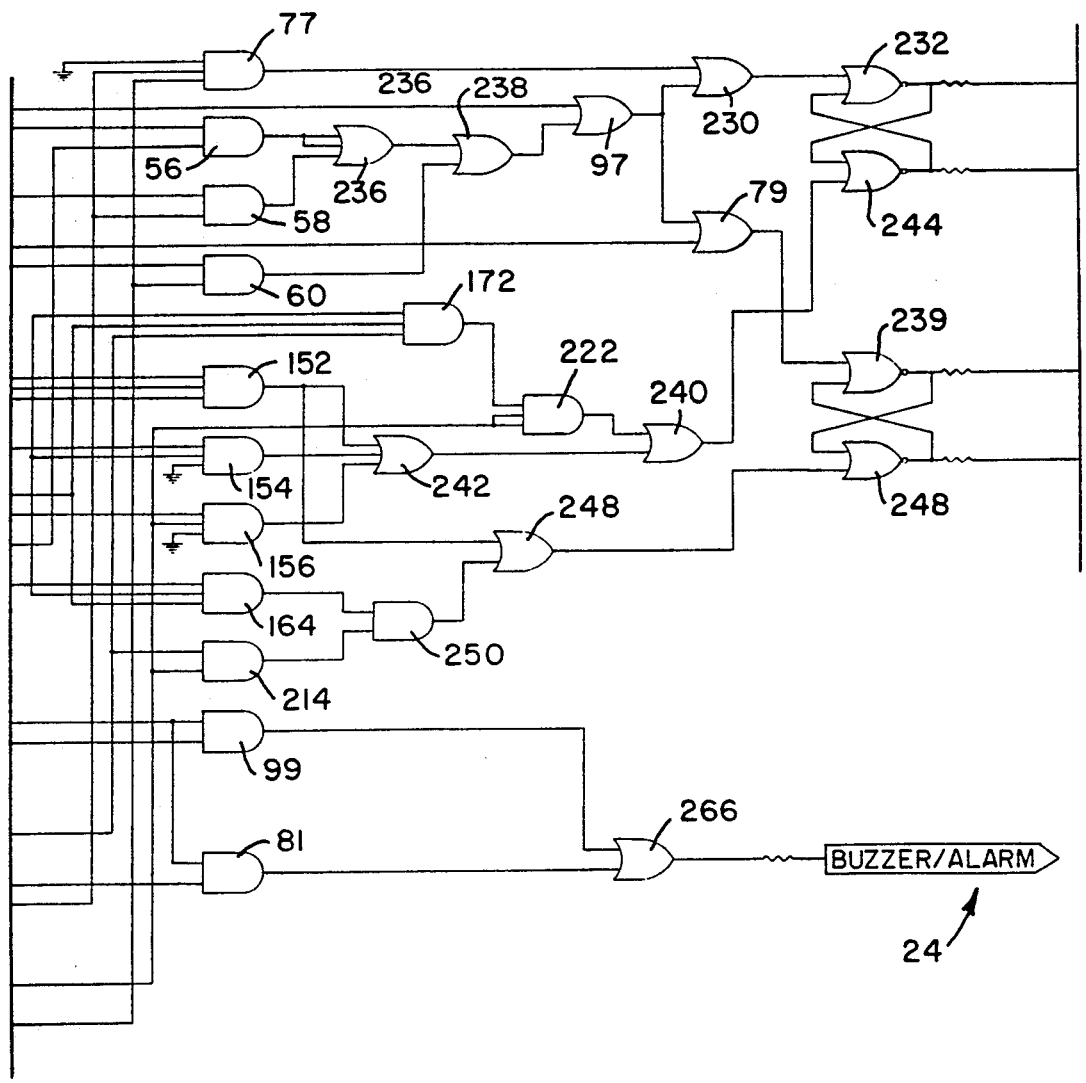
Figure 4C:
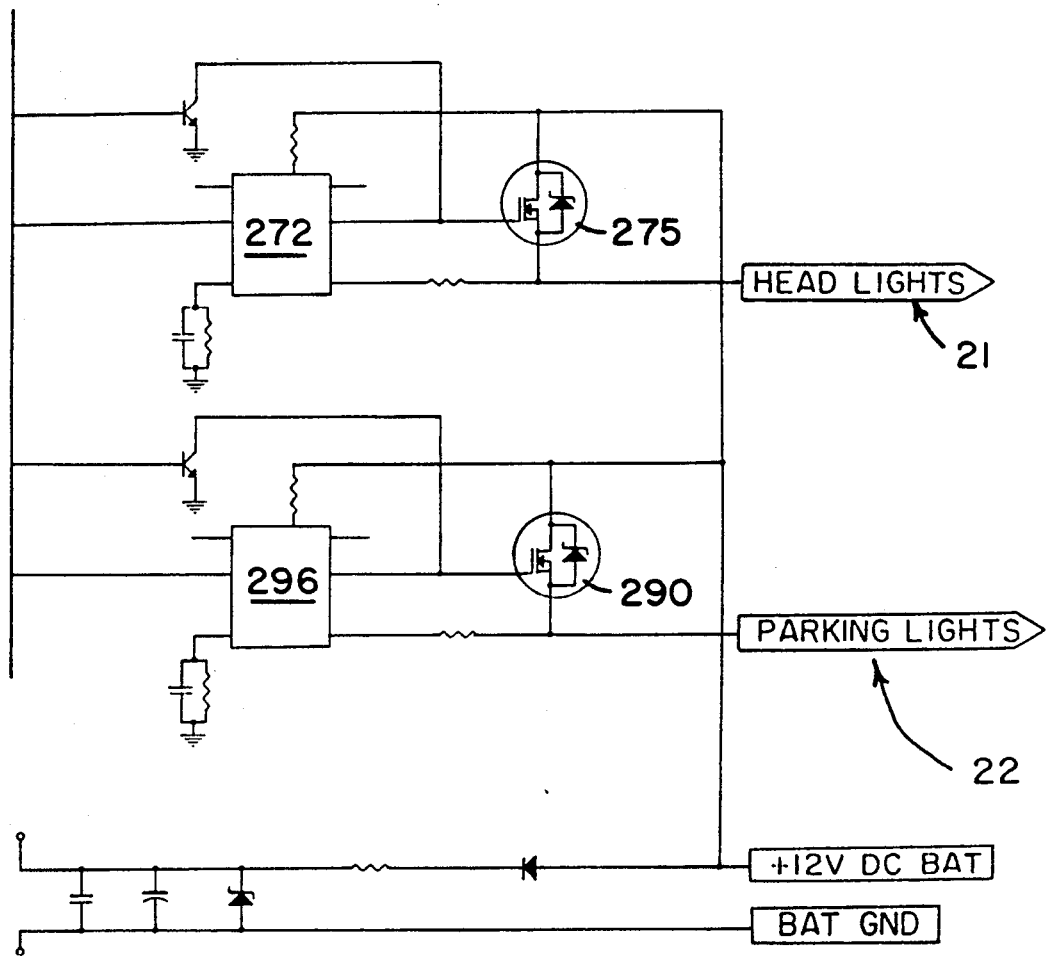

The 6/3 modification illustrated in FIGS. 4a, 4b and 4c differs from that in FIG. 1 in that in FIGS. 4a, 4b and 4c the inputs are the same as in FIGS. 1a and 1b but the outputs are only for the headlights 21, parking lights 22, and the alarm 24, the windshield wiper output being omitted.

The windshield wiper input is included in FIGS. 4a, 4b and 4c in order to control the headlights and the parking lights. However, it is contemplated that the operation of the windshield wipers will be under conventional vehicle control rather than through the present system.

Thus, those parts of the digital logic circuitry of FIGS. 1a and 1b are included in FIGS. 4a, 4b and 4c for the purpose of controlling the outputs to the controls for the headlights and parking lights but that for the windshield wiper is omitted. In the logic circuit, the result is that the gates 123, 158, 62, 139, 262, 260, and 264 are omitted from FIGS. 1a and 1b. Except for this, the logic circuitry is the same as in FIG. 1a and 1b.

MODIFICATION WITH SIX INPUTS AND THREE OUTPUTS, USING THE PROM CHIP

Figure 5A:
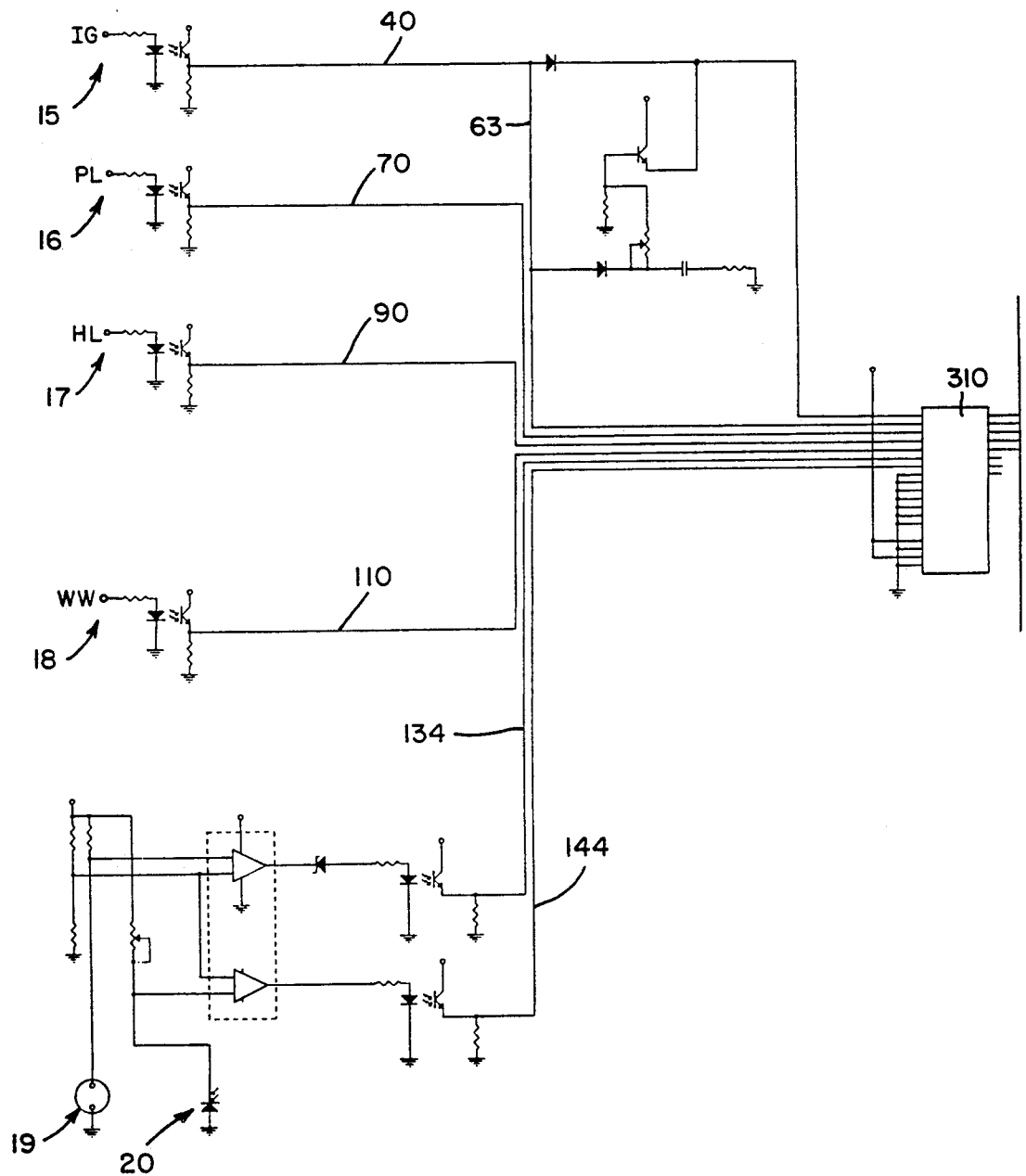
FIGS. 5a and 5b and (A, and B) a schematic similar to FIGS. 4a, 4b and 4c in which the digital logic circuit is a PROM.
Figure 5B:
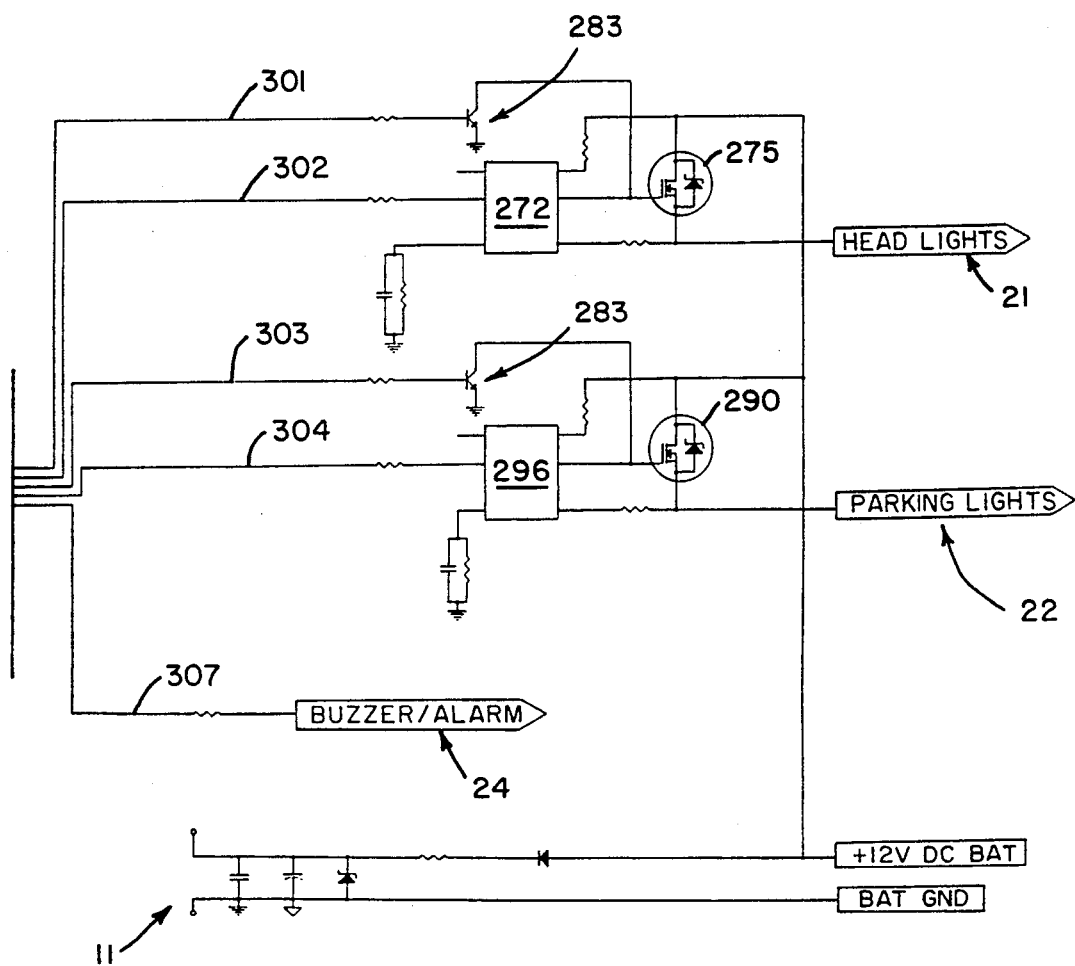

FIGS. 5a and 5b illustrates a modification with six inputs and three outputs in which a PROM chip is used instead of the discrete digital logic circuitry of FIGS. 4a, 4b and 4c.

MODIFICATION WITH SIX INPUTS AND THREE OUTPUTS, USING THE PAL CHIP

Figure 6A:
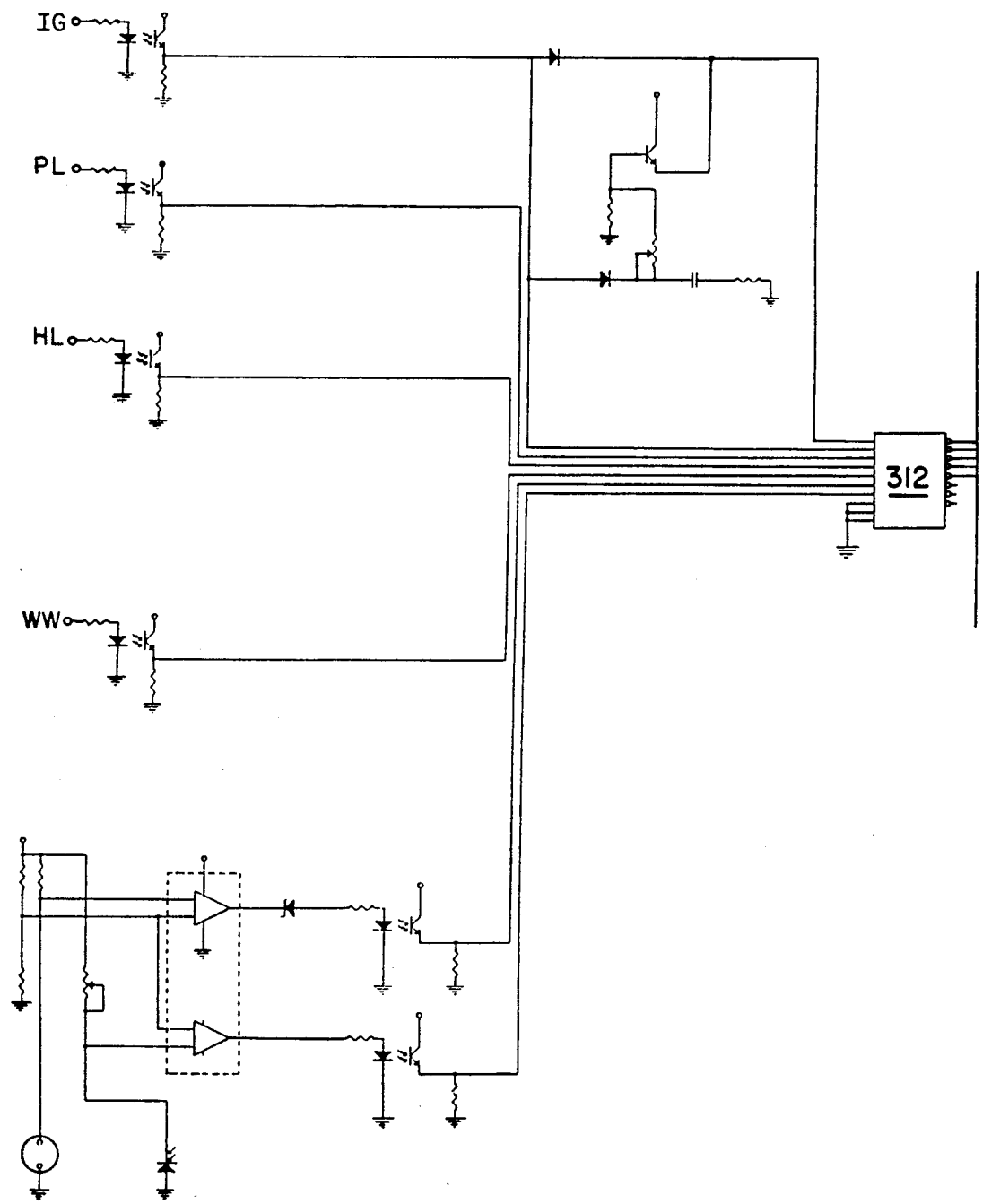
FIGS. 6a and 6b are (A, and B) a schematic similar to FIGS. 4a, 4b and 4c in which the digital logic circuit is PLA.
Figure 6B:
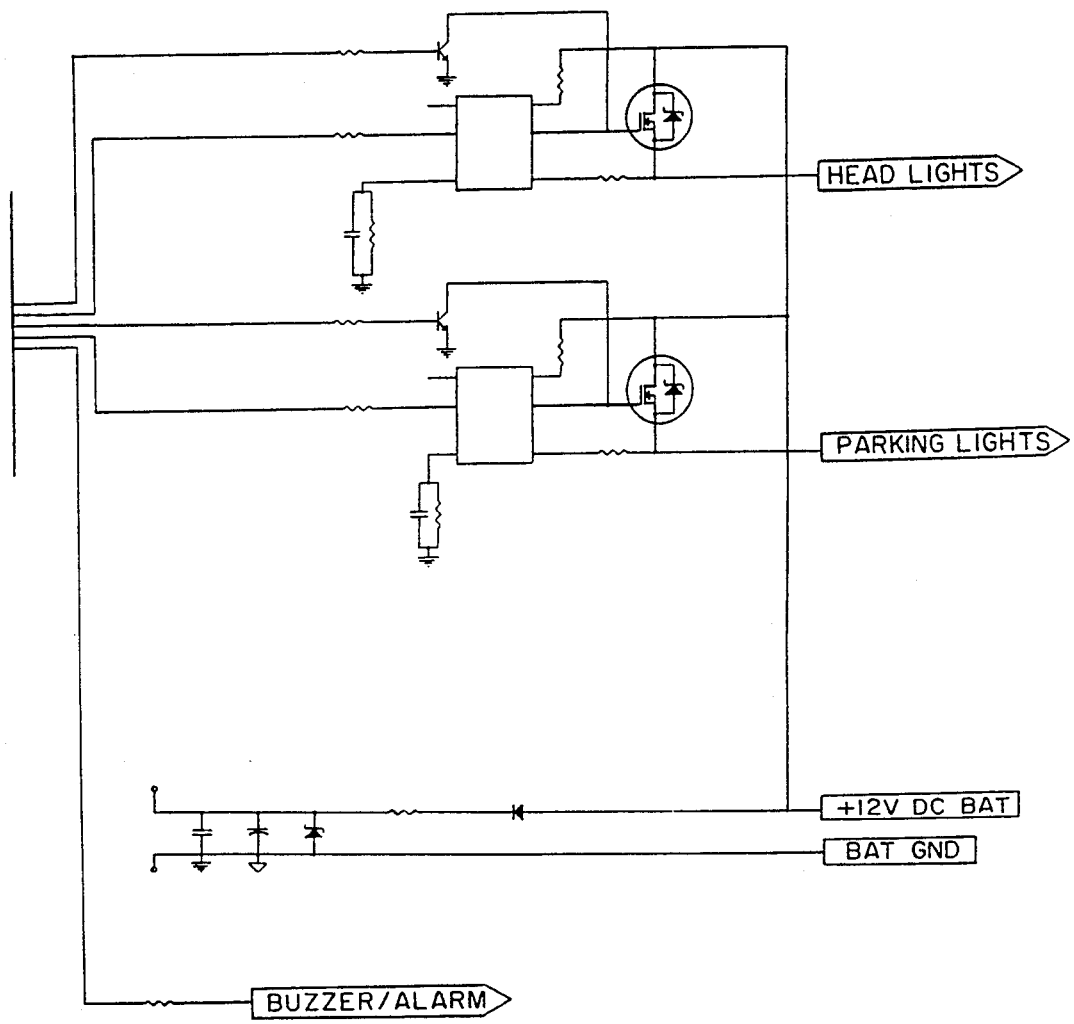

FIGS. 6a and 6b is similar to FIGS. 5a and 5b except that in place of the PROM chip 310 in FIGS. 5a and 5b a PLA chip 312 has been substituted.

A Truth Table, Table II, for FIGS. 4a, 4b, 4c–6a and 6b are as follows:

TABLE II

TRUTH TABLE
6 INPUTS, 3 OUTPUTS

| INPUTS | | | | | | OUTPUTS | | |
|---|---|---|---|---|---|---|---|---|
| IG | PL | HL | WW | MS | LS | PL | HL | BZ |
| 0 | 0 | 0 | 0 | 0 | 0 | 0 | 0 | 0 |
| 0 | 0 | 0 | 0 | 0 | 1 | 0 | 0 | 0 |
| 0 | 0 | 0 | 0 | 1 | 0 | 0 | 0 | 0 |
| 0 | 0 | 0 | 0 | 1 | 1 | 0 | 0 | 0 |
| 0 | 0 | 0 | 1 | 0 | 0 | 0 | 0 | 0 |
| 0 | 0 | 0 | 1 | 0 | 1 | 0 | 0 | 0 |
| 0 | 0 | 0 | 1 | 1 | 0 | 0 | 0 | 0 |
| 0 | 0 | 0 | 1 | 1 | 1 | 0 | 0 | 0 |
| 0 | 0 | 1 | 0 | 0 | 0 | 1 | 1 | 1 |
| 0 | 0 | 1 | 0 | 0 | 1 | 1 | 1 | 1 |
| 0 | 0 | 1 | 0 | 1 | 0 | 1 | 1 | 1 |
| 0 | 0 | 1 | 0 | 1 | 1 | 1 | 1 | 1 |
| 0 | 0 | 1 | 1 | 0 | 0 | 1 | 1 | 1 |
| 0 | 0 | 1 | 1 | 0 | 1 | 1 | 1 | 1 |
| 0 | 0 | 1 | 1 | 1 | 0 | 1 | 1 | 1 |
| 0 | 0 | 1 | 1 | 1 | 1 | 1 | 1 | 1 |
| 0 | 1 | 0 | 0 | 0 | 0 | 1 | 0 | 1 |
| 0 | 1 | 0 | 0 | 0 | 1 | 1 | 0 | 1 |
| 0 | 1 | 0 | 0 | 1 | 0 | 1 | 0 | 1 |
| 0 | 1 | 0 | 0 | 1 | 1 | 1 | 0 | 1 |
| 0 | 1 | 0 | 1 | 0 | 0 | 1 | 0 | 1 |
| 0 | 1 | 0 | 1 | 0 | 1 | 1 | 0 | 1 |
| 0 | 1 | 0 | 1 | 1 | 0 | 1 | 0 | 1 |
| 0 | 1 | 0 | 1 | 1 | 1 | 1 | 0 | 1 |
| 0 | 1 | 1 | 0 | 0 | 0 | 1 | 1 | 1 |
| 0 | 1 | 1 | 0 | 0 | 1 | 1 | 1 | 1 |
| 0 | 1 | 1 | 0 | 1 | 0 | 1 | 1 | 1 |
| 0 | 1 | 1 | 0 | 1 | 1 | 1 | 1 | 1 |
| 0 | 1 | 1 | 1 | 0 | 0 | 1 | 1 | 1 |
| 0 | 1 | 1 | 1 | 0 | 1 | 1 | 1 | 1 |
| 0 | 1 | 1 | 1 | 1 | 0 | 1 | 1 | 1 |
| 0 | 1 | 1 | 1 | 1 | 1 | 1 | 1 | 1 |
| 1 | 0 | 0 | 0 | 0 | 0 | 0 | 0 | 0 |
| 1 | 0 | 0 | 0 | 0 | 1 | 1 | 1 | 0 |
| 1 | 0 | 0 | 0 | 1 | 0 | 1 | 1 | 0 |
| 1 | 0 | 0 | 0 | 1 | 1 | 1 | 1 | 0 |
| 1 | 0 | 0 | 1 | 0 | 0 | 1 | 1 | 0 |
| 1 | 0 | 0 | 1 | 0 | 1 | 1 | 1 | 0 |
| 1 | 0 | 0 | 1 | 1 | 0 | 1 | 1 | 0 |
| 1 | 0 | 0 | 1 | 1 | 1 | 1 | 1 | 0 |
| 1 | 0 | 1 | 0 | 0 | 0 | 1 | 1 | 0 |
| 1 | 0 | 1 | 0 | 0 | 1 | 1 | 1 | 0 |
| 1 | 0 | 1 | 0 | 1 | 0 | 1 | 1 | 0 |
| 1 | 0 | 1 | 0 | 1 | 1 | 1 | 1 | 0 |
| 1 | 0 | 1 | 1 | 0 | 0 | 1 | 1 | 0 |
| 1 | 0 | 1 | 1 | 0 | 1 | 1 | 1 | 0 |
| 1 | 0 | 1 | 1 | 1 | 0 | 1 | 1 | 0 |
| 1 | 0 | 1 | 1 | 1 | 1 | 1 | 1 | 0 |
| 1 | 1 | 0 | 0 | 0 | 0 | 1 | 0 | 0 |
| 1 | 1 | 0 | 0 | 0 | 1 | 1 | 1 | 0 |
| 1 | 1 | 0 | 0 | 1 | 0 | 1 | 1 | 0 |
| 1 | 1 | 0 | 0 | 1 | 1 | 1 | 1 | 0 |
| 1 | 1 | 0 | 1 | 0 | 0 | 1 | 1 | 0 |
| 1 | 1 | 0 | 1 | 0 | 1 | 1 | 1 | 0 |
| 1 | 1 | 0 | 1 | 1 | 0 | 1 | 1 | 0 |
| 1 | 1 | 0 | 1 | 1 | 1 | 1 | 1 | 0 |
| 1 | 1 | 1 | 0 | 0 | 0 | 1 | 1 | 0 |
| 1 | 1 | 1 | 0 | 0 | 1 | 1 | 1 | 0 |
| 1 | 1 | 1 | 0 | 1 | 0 | 1 | 1 | 0 |
| 1 | 1 | 1 | 0 | 1 | 1 | 1 | 1 | 0 |
| 1 | 1 | 1 | 1 | 0 | 0 | 1 | 1 | 0 |
| 1 | 1 | 1 | 1 | 0 | 1 | 1 | 1 | 0 |
| 1 | 1 | 1 | 1 | 1 | 0 | 1 | 1 | 0 |
| 1 | 1 | 1 | 1 | 1 | 1 | 1 | 1 | 0 |

MODIFICATION WITH FOUR INPUTS AND TWO OUTPUTS

The 4/2 modification includes the same four types of sections, namely an input 10, voltage supply 11, logic 12, and an output section 13. The input section includes inputs for the ignition 15, windshield wipers 18, moisture sensor 19, and light sensor 20.

There are outputs to the combined headlights-parking lights 21 and windshield wipers 23.

The inputs, 15, 18, 19, and 20 correspond to the similar inputs in FIG. 1 and result in the lines 52, 53, 122, 125, 133, 134, 143, and 144 corresponding to those in FIGS. 1a and 1b as indicated.

Figure 7A:
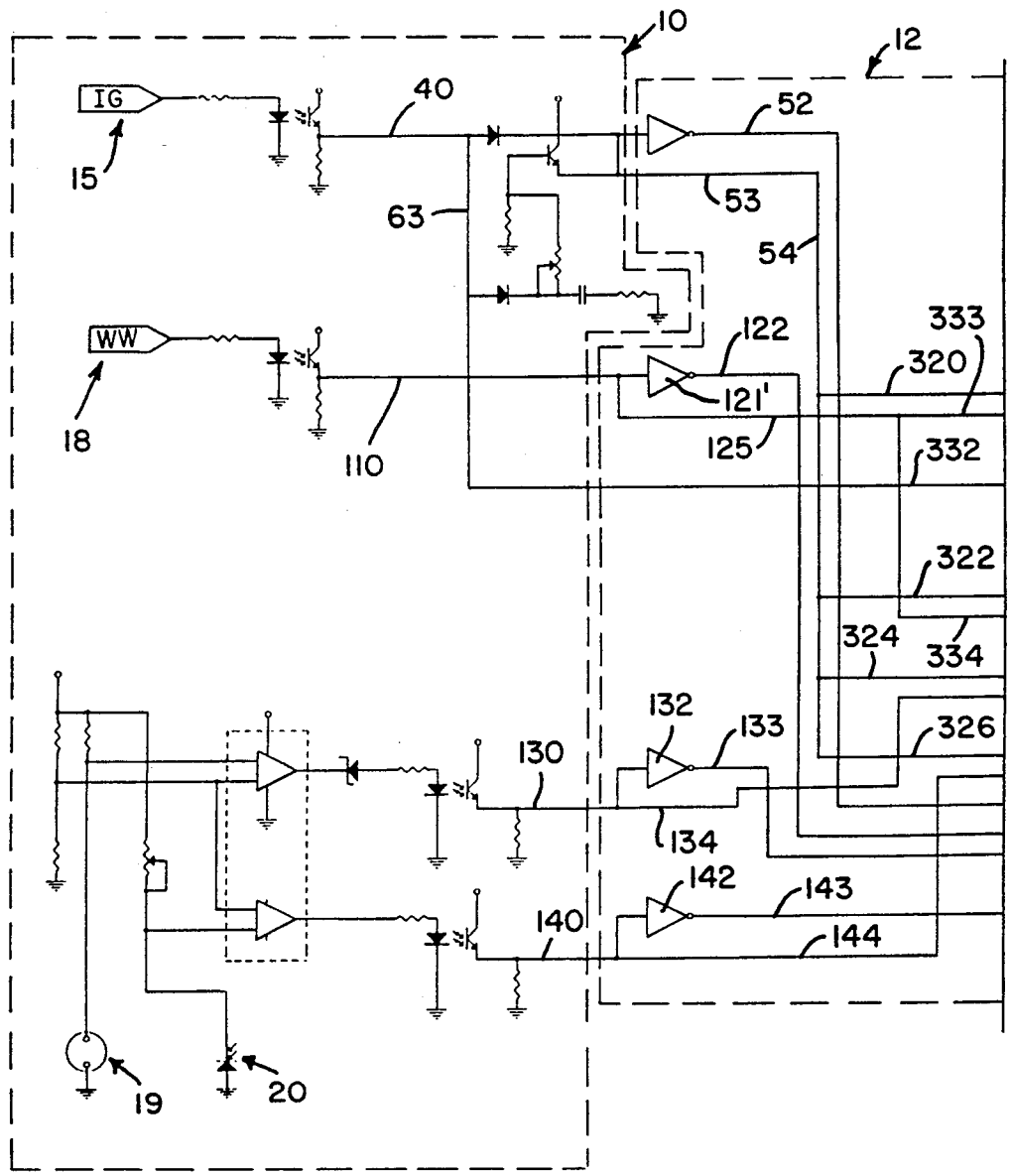
FIGS. 7a, 7b and 7c are (A, B and C) a schematic of a modification in which the input switches are ignition, windshield wipers, moisture sensor and light sensor, and in which the outputs are windshield wipers and headlights and parking lights combined and connected through a discrete digital logic circuit.
Figure 7B:
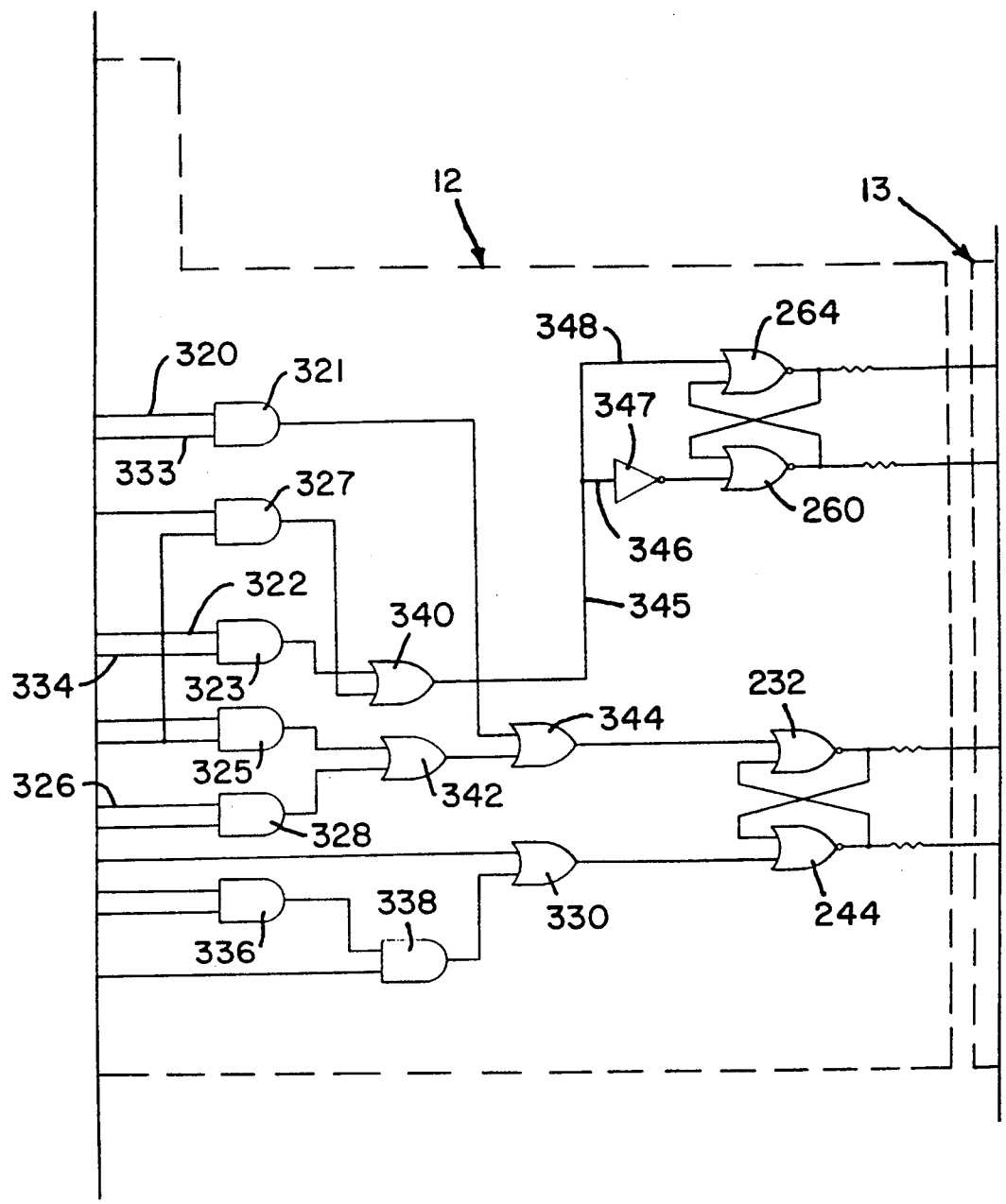
Figure 7C:
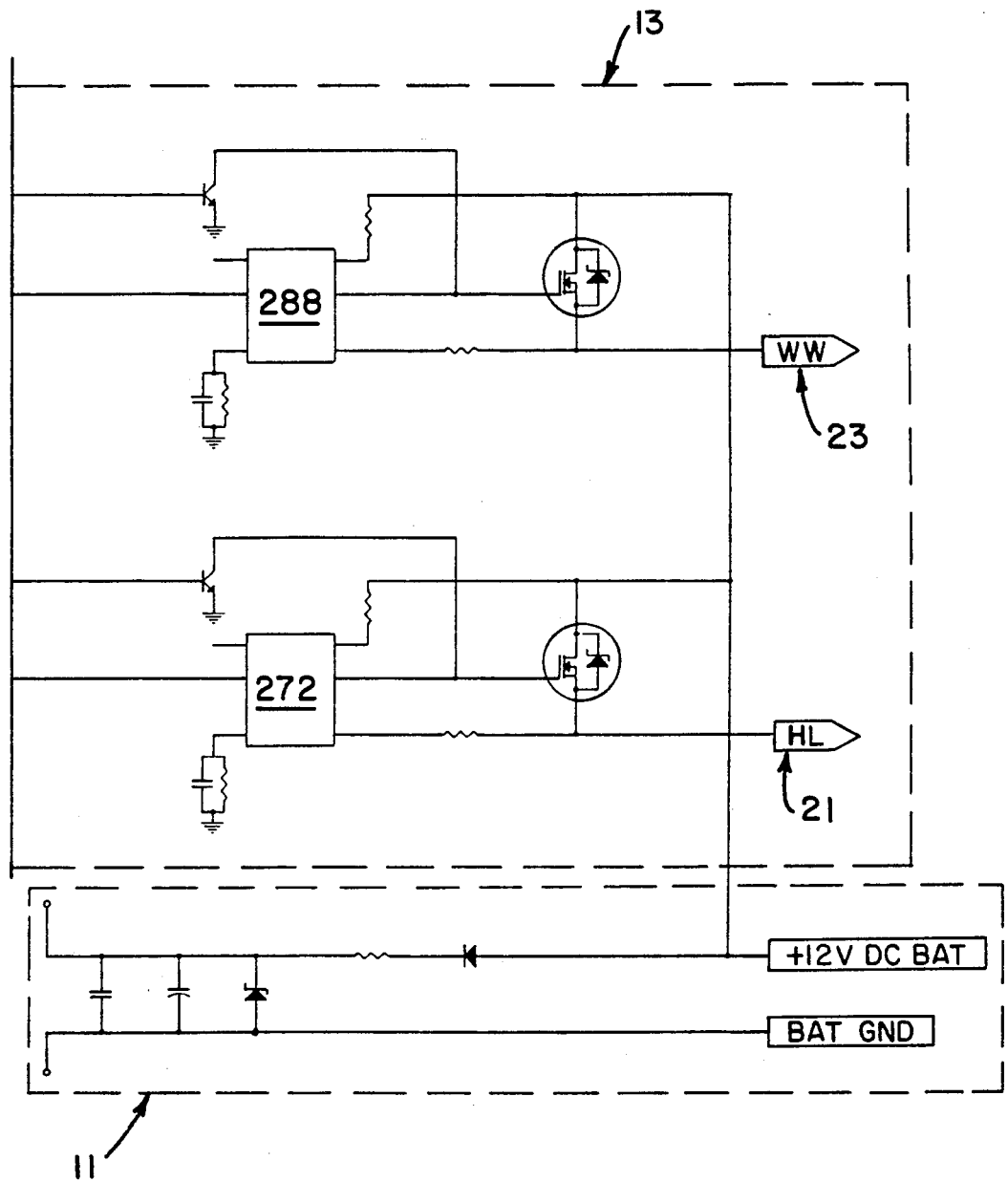

The digital logic circuitry however differs somewhat from that in FIGS. 1a and 1b. Thus, in FIGS. 7a, 7b and 7c the ignition switch trunk line 54 has a lead 320 to AND gate 321, a lead 322 to AND gate 323, a lead 324 to AND gate 325, and a lead 326 to AND gate 328. The ignition inverter output line 52 is connected to OR gate 330. Branch 63 is connected to AND gate 327.

Windshield wiper main line 125 is connected to trunk line 332, having a branch line 333, to AND gate 321 and a branch 334 to AND gate 323. Windshield wiper inverter line 122 is connected to AND gate 336.

Line 134 from the moisture sensor is connected to AND gate 325. The inverted output line 133 from the moisture sensor is connected to AND gate 336.

Line 144 from the light sensor is connected to AND gate 328. The inverted output line 143 from the light sensor is connected to AND gate 338.

AND gates 323 and 327 are connected to OR gate 340. AND gates 325 and 328 are connected to OR gate 342. AND gate 321 and OR gate 342 are connected to OR gate 344. OR gate 340 is connected to line 345 having a branch 346 to inverter 347 to NOR gate 260 and a branch 348 to NOR gate 264. Gates 260 and 264 are in latching relationship and connected to MOS driver 288. OR gates 344 and 330 are connected, respectively, to NOR gates 232 and 244 which are in latching relationship and connected to the MOS driver 272.

MODIFICATION WITH FOUR INPUTS, TWO OUTPUTS AND A PROM CHIP

Figure 8A:
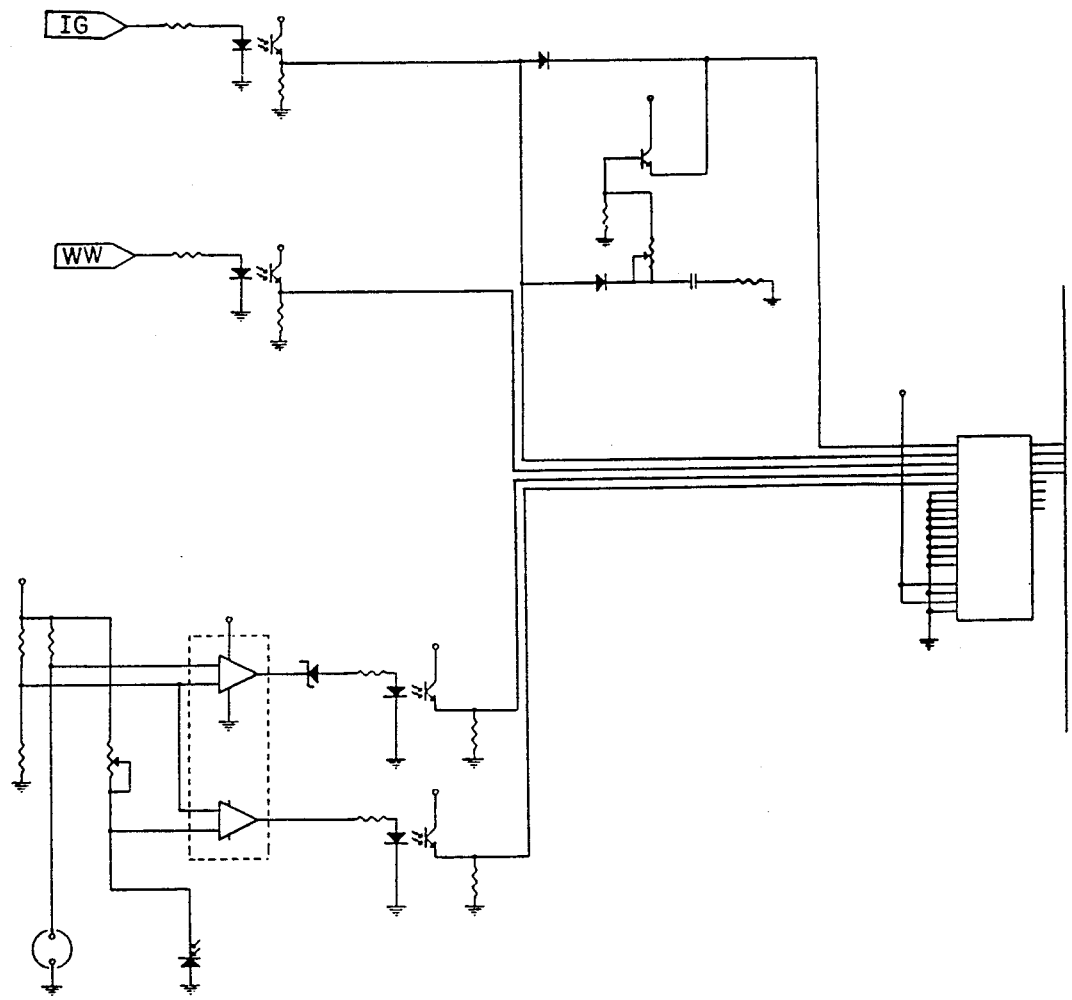
FIGS. 8a and 8b are (A, and B) a schematic similar to FIGS. 7a, 7b and 7c in which the digital logic circuit is a PROM.
Figure 8B:
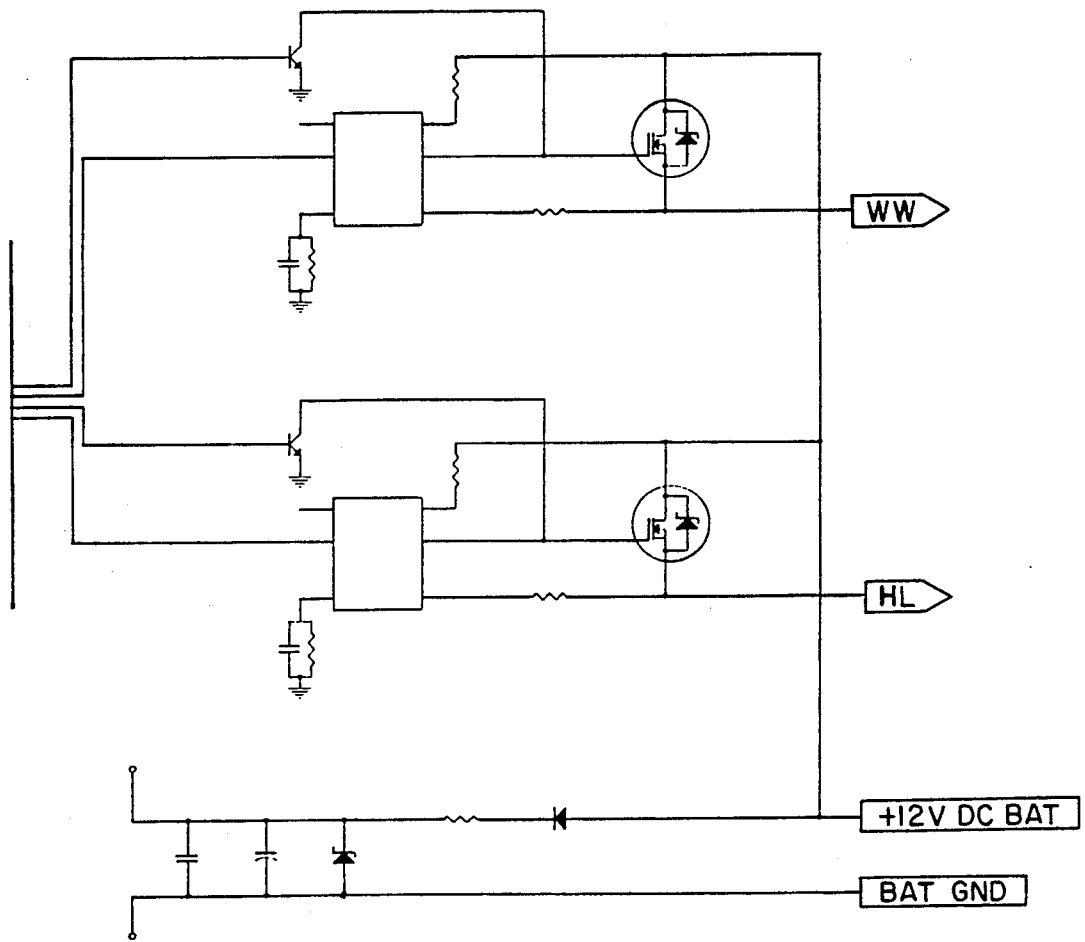

FIGS. 8a and 8b illustrate the arrangement using four inputs, two outputs and a PROM chip. As described in connection with the preceding, the PROM chip is inserted in place of the discrete digital logic circuitry.

MODIFICATION WITH FOUR INPUTS, TWO OUTPUTS AND A PAL CHIP

Figure 9A:
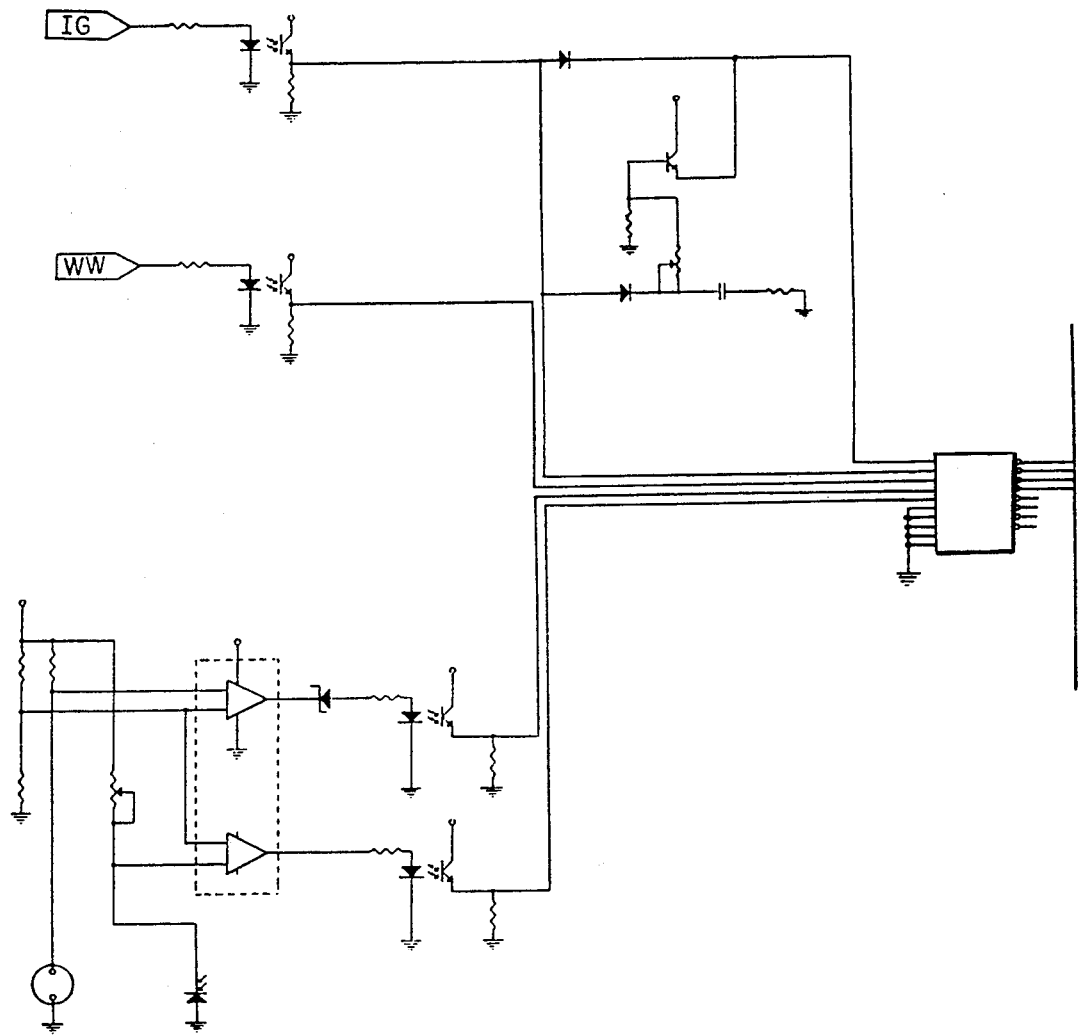
FIGS. 9a and 9b are (A, and B) a schematic similar to FIGS. 7a, 7b and 7c in which the digital logic circuit is a PLA.
Figure 9B:
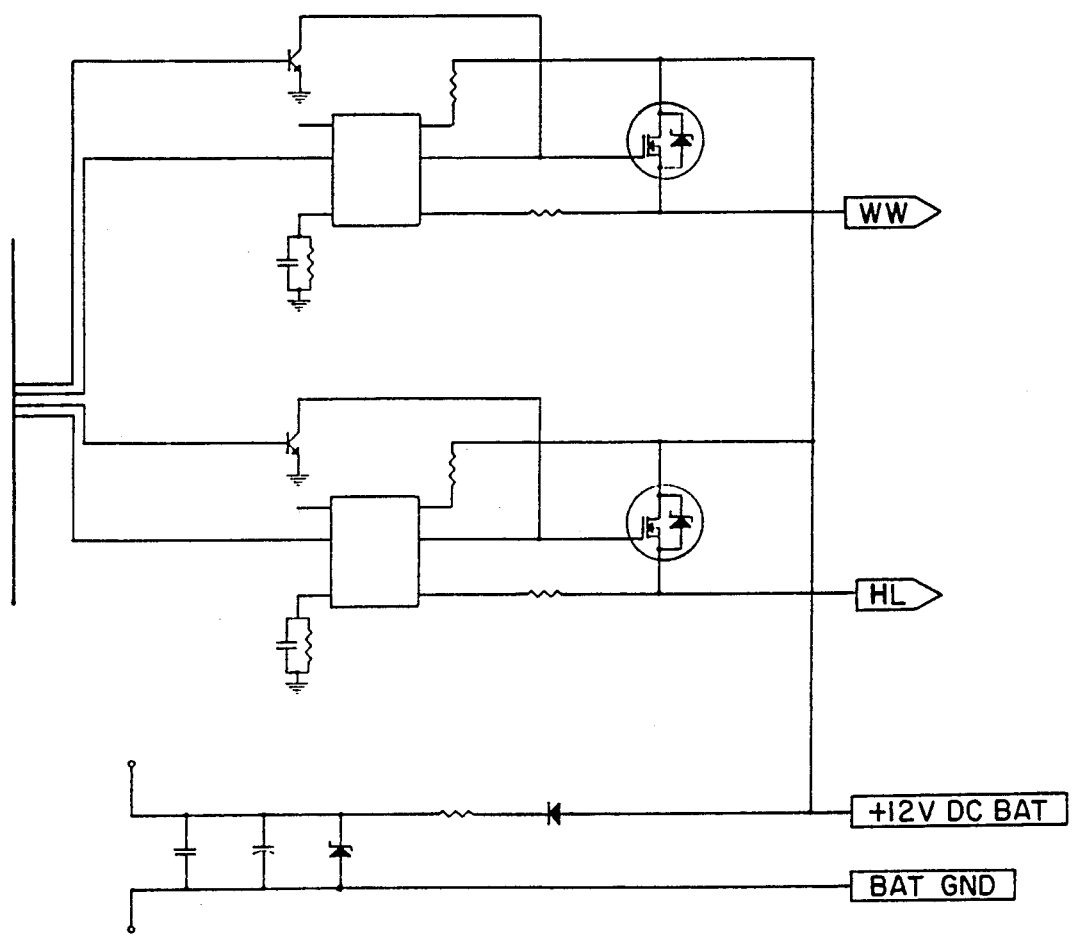

The modification of FIGS. 9a and 9b are similar to that of FIGS. 8a and 8b except that a PLA chip is substituted for the PROM chip of FIG. 8.

A Truth Table, Table III, for FIGS. 7a, 7b, 7c-9a and 9b is as follows:

TABLE III

TRUTH TABLE
4 INPUTS, 2 OUTPUTS

| INPUTS | | | | OUTPUTS | |
|---|---|---|---|---|---|
| IG | WW | MS | LS | HL&PL | WW |
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 0 | 0 |
| 0 | 1 | 0 | 0 | 0 | 0 |
| 0 | 1 | 0 | 1 | 0 | 0 |
| 0 | 1 | 1 | 0 | 0 | 0 |
| 0 | 1 | 1 | 1 | 0 | 0 |
| 1 | 0 | 0 | 0 | 0 | 0 |
| 1 | 0 | 0 | 1 | 1 | 0 |
| 1 | 0 | 1 | 0 | 1 | 1 |
| 1 | 0 | 1 | 1 | 1 | 1 |
| 1 | 1 | 0 | 0 | 1 | 1 |
| 1 | 1 | 0 | 1 | 1 | 1 |
| 1 | 1 | 1 | 0 | 1 | 1 |
| 1 | 1 | 1 | 1 | 1 | 1 |

MODIFICATION WITH THREE INPUTS AND ONE OUTPUT

Figure 10A:
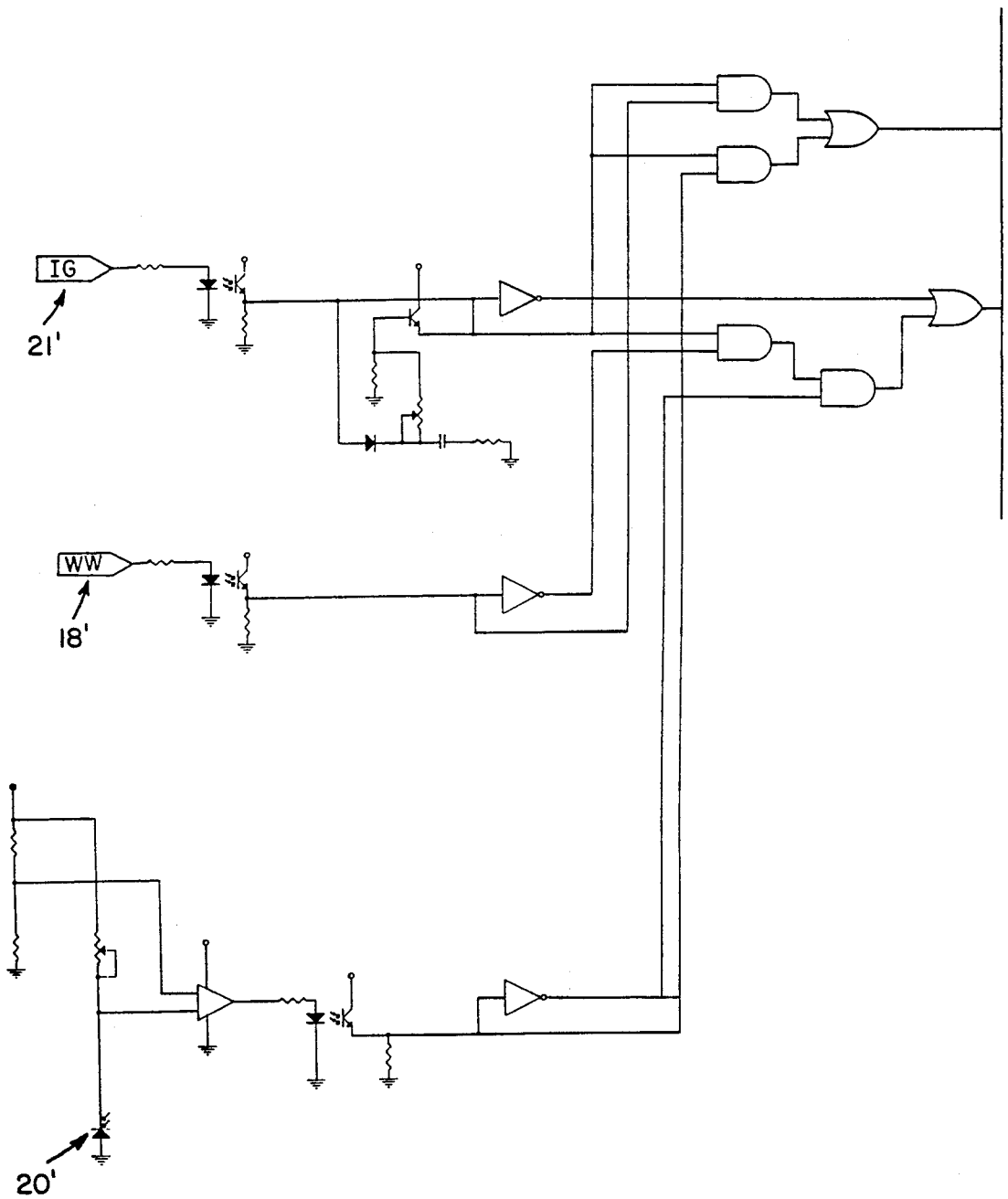
FIGS. 10a and 10b are (A, and B) a modification in which the inputs switches are ignition, windshield wipers and light sensor, and in which the output is a combined headlights and parking lights and in which these are connected through a discrete digital logic circuit.
Figure 10B:
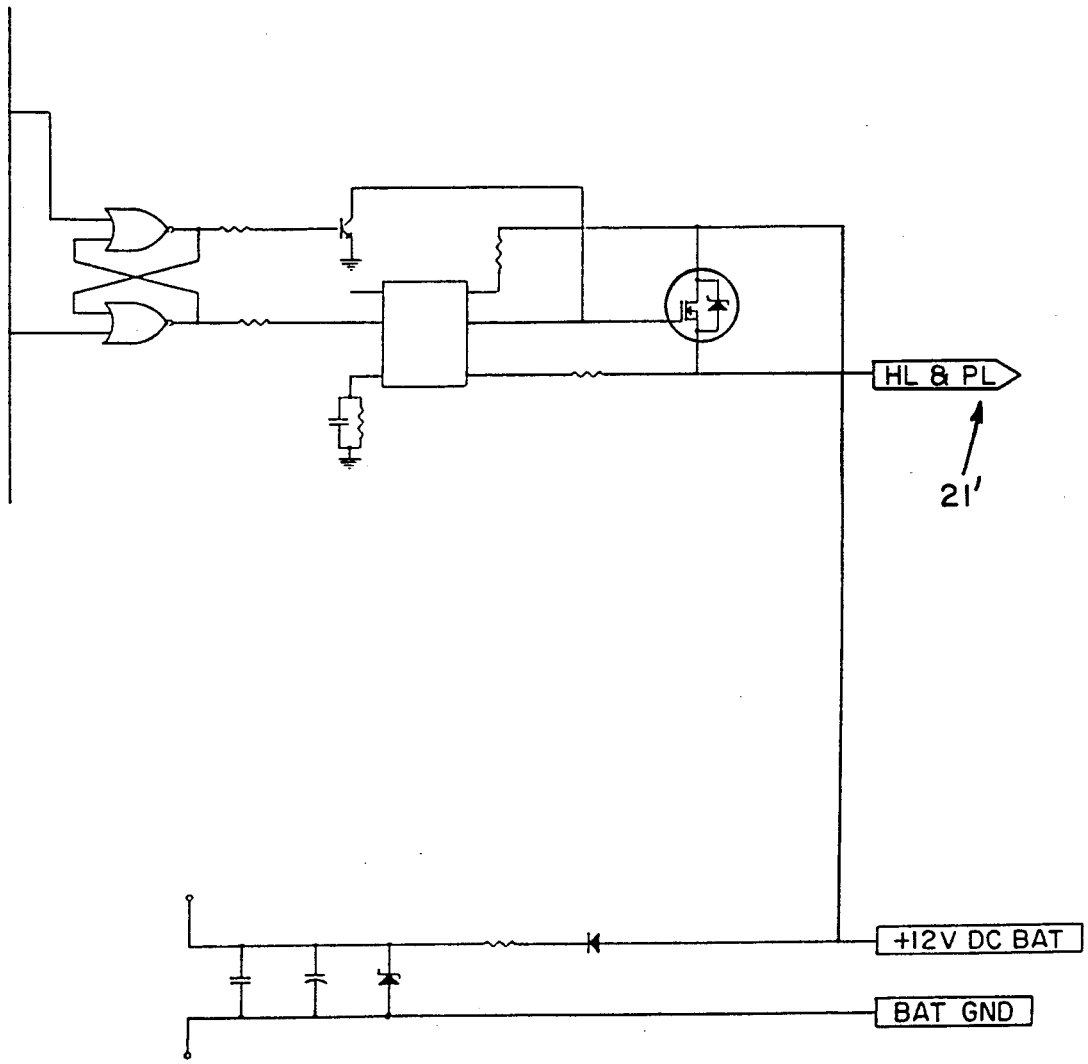

This 3/1 after market modification of FIGS. 10a and 10b are especially intended for installation on a vehicle after it has left the factory. In it, the input terminals are connected to the outputs of existing switches on the vehicle.

The input section includes inputs for the ignition 21', windshield wipers 18' and a light sensor 20'. The sole output is for a combined headlight and parking light 21'.

The digital logic circuitry is arranged in FIG. 10 according to general principles in order to control the headlight-parking light combination in accordance with Truth Table IV.

MODIFICATION WITH THREE INPUTS, ONE OUTPUT AND A PROM CHIP

Figure 11B:
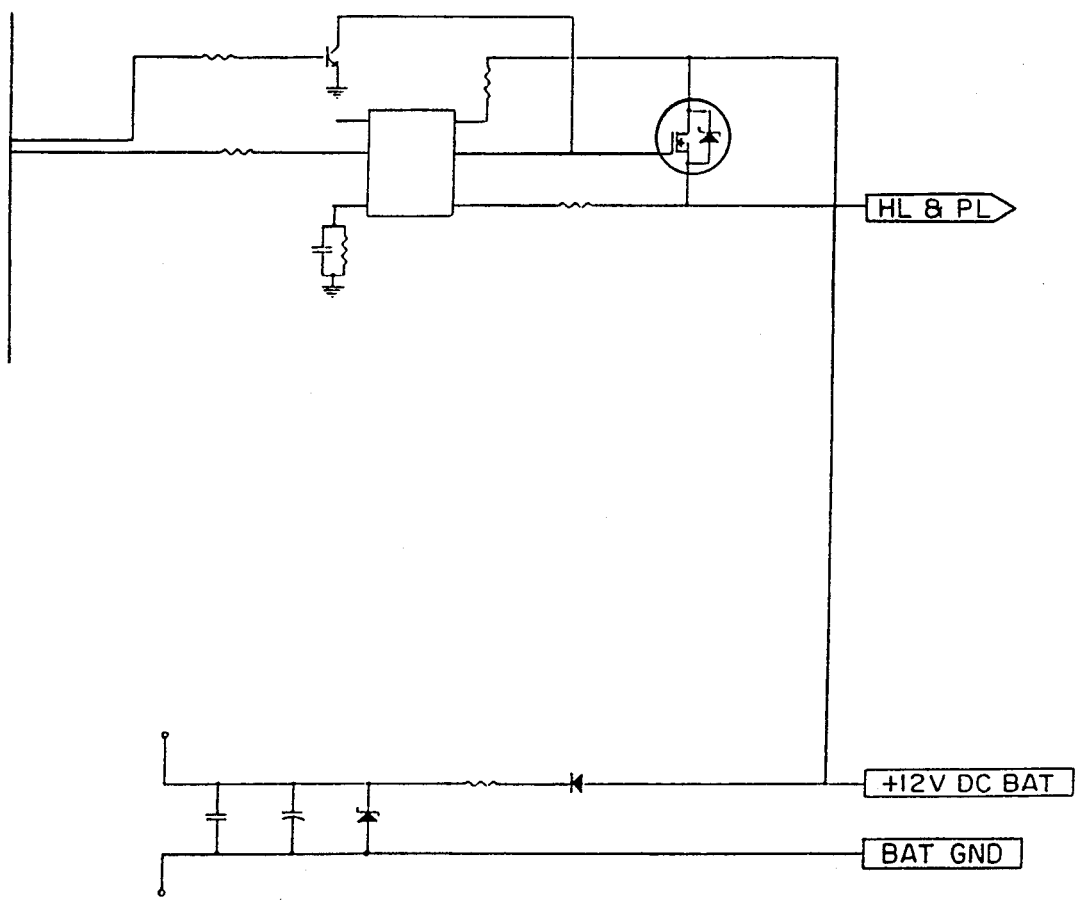

FIGS. 11a and 11b illustrate the system using three inputs, one output and a PROM chip inserted in place of the discrete digital logic circuitry.

MODIFICATION WITH THREE INPUTS, ONE OUTPUT AND A PLA CHIP

Figure 12A:
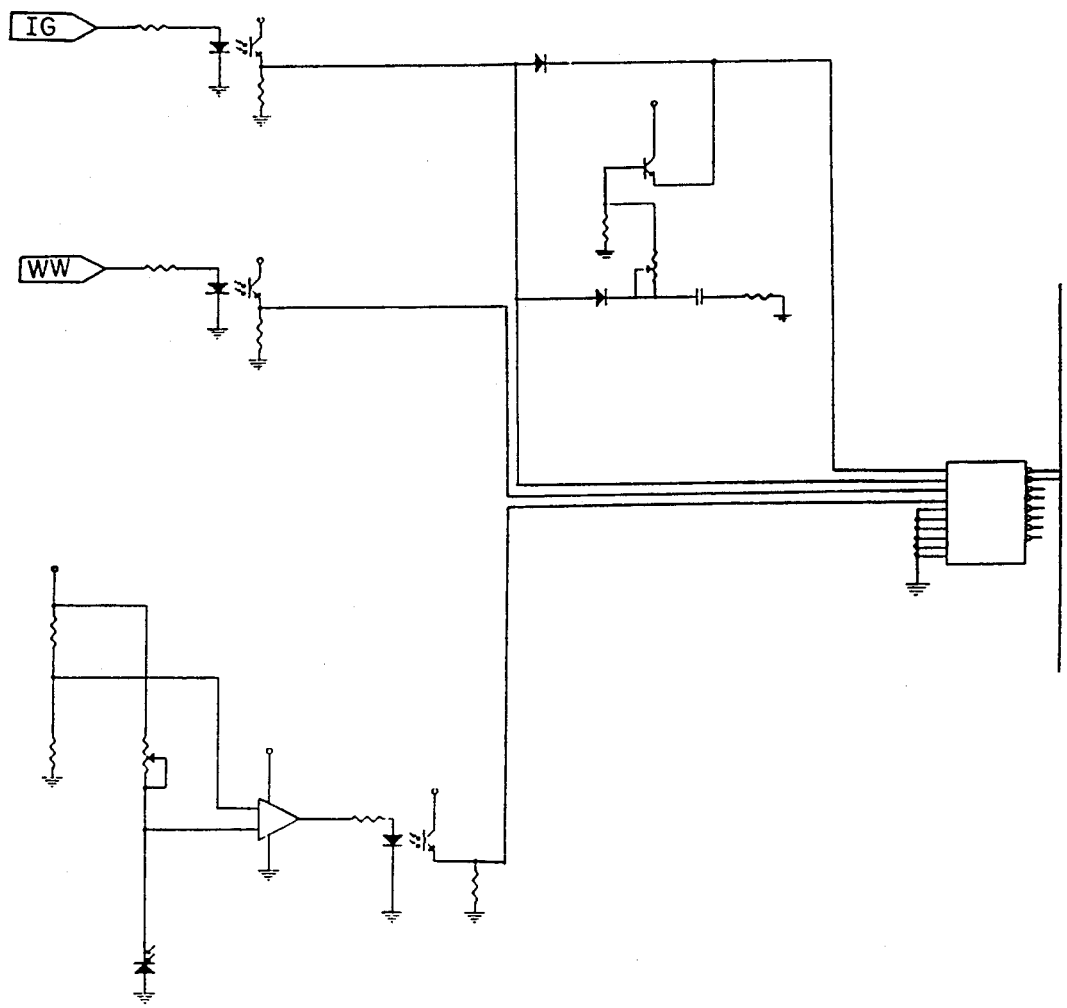
FIGS. 12a and 12b are (A, and B) a schematic similar to FIGS. 10a and 10b in which the digital logic circuit is a PLA.
Figure 12B:
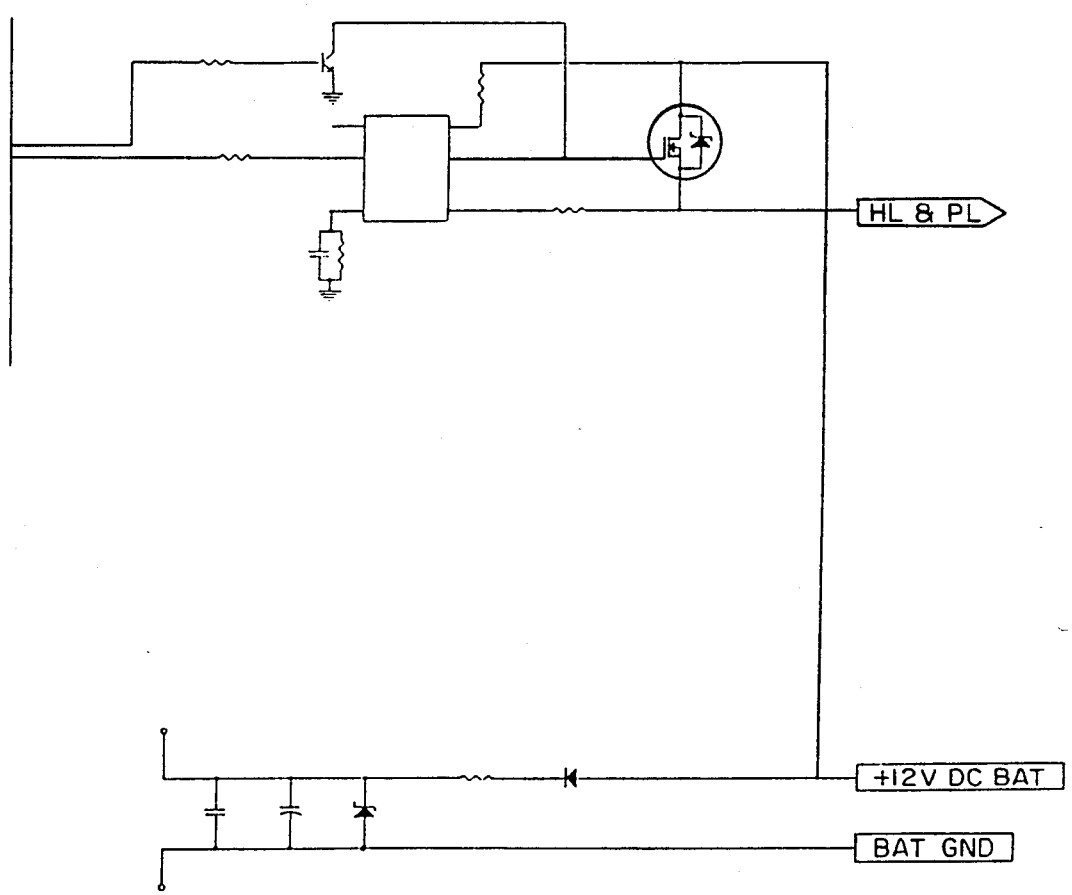

FIGS. 12a and 12b illustrate the system using three inputs, one output and a PLA chip substituted for the PROM chip of FIGS. 11a and 11b.

A Truth Table, Table IV, for FIGS. 10a, 10b, 11a, 11b, 12a and 12b is as follows:

TABLE IV

| TRUTH TABLE 3 INPUTS, 1 OUTPUT | | | |
|---|---|---|---|
| INPUTS | | | OUTPUTS |
| IG | WW | LS | HL&PL |
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 1 |

We claim:

1. An automatic system in a vehicle having switches for headlights, parking lights and a windshield wiper for controlling the turning ON of vehicle headlights and parking lights, having input switches, when any of the following switch combinations are turned ON:
   a) ignition, windshield wiper, light sensor;
   b) ignition, and windshield wiper;
   c) ignition and light sensor; and keeping them ON as long as any of such switch combinations are ON, comprising manual ON/OFF switches for the ignition and windshield wiper and a condition responsive switch for the light sensor, a programmable digital logic circuit, an electronic circuit comprising a relay circuit and a relay switch, said relay switch having means for connecting said headlights to power supply means, said relay circuit being alternately connectable to actuating means for said relay switch which governs the connection of said headlights to said power supply means, said power supply means connected to said relay circuit, and control means for the relay circuit, said programmable digital logic circuit connecting the outputs of said ignition, windshield wiper and light sensor switches to the control means for said relay circuit.

2. The system of claim 1, in which the electronic circuit also includes a driver circuit for the relay switch.

3. The system of claim 1, and opto-isolator semi-conductor means between the ignition, windshield wiper and light sensor switches and the relay circuit which isolates the input voltages from the outputs of the semiconductor means.

4. The system of claim 1, in which the vehicle has an alarm, and in which the digital logic circuit connects the inputs from the ignition, parking lights, headlights and windshield wipers to the alarm, wherein the alarm is activated whenever the parking lights or headlights is activated and the ignition is not activated.

5. The system of claim 1, and a voltage regulator connected to said electronic circuit.

6. The system of claim 1, in which the programmable digital logic circuit is a PROM.

7. The system of claim 1, in which the programmable digital logic circuit is a PLA.

8. The system of claim 1, in which the relay switch is a high side driver and the relay circuit is a power MOSFET.

9. The system of claim 8, in which the digital logic circuit is a PROM.

10. The system of claim 8, in which the digital logic circuit is a PLA.

11. An automatic switching means for controlling the activation of the parking lights and headlights of a vehicle having input switches for the ignition, parking lights, headlights, windshield wipers, moisture sensor and light sensor, comprising, input circuits with inputs responsive to signals from the ignition, parking lights, headlights, windshield wipers, moisture sensor and light sensor, a programmable digital logic circuit connecting the input signals to output circuits, each of said output circuits comprising an electronic switching means connected to the headlights and parking lights, in which the electronic switching means comprises an integrated driver circuit and a relay circuit, each relay circuit comprising an integrated circuit which includes both the relay switching circuit and a switched circuit, a switched circuit connecting to each of the headlights, parking lights and windshield wipers, wherein the headlights and parking lights are activated in accordance with a Truth Table, Table II.

12. The system of claim 11, in which the vehicle has an alarm and in which the digital logic circuit connects the inputs from the ignition, parking lights, headlights and windshield wipers to the alarm, wherein the alarm is activated whenever the parking lights or headlights is activated and the ignition is not activated.

13. The system of claim 11, and a voltage regulator connected to said electronic switching means.

14. The system of claim 11, in which the digital logic circuit is a PROM.

15. The system of claim 11, in which the digital logic circuit is a PLA.

16. The system of claim 11, in which the electronic switching means for the outputs is a high side driver and the relay is a power MOSFET.

17. The system of claim 16, in which the digital logic circuit is a PROM.

18. The system of claim 16, in which the digital logic circuit is a PLA.

19. An automatic system for controlling the activation of the headlight-parking light system and windshield wipers of a vehicle having input switches for the ignition, windshield wipers, moisture sensor and light sensor, comprising input circuits with inputs responsive to signals from the ignition, windshield wipers, moisture sensor and light sensor, a programmable digital logic circuit connecting the input signals to output circuits, each of the output circuits comprising electronic switching means connected to the headlight-parking light system and windshield wipers, in which the electronic switching means comprising an integrated driver circuit and a relay circuit, each relay circuit comprising an integrated circuit which includes both a relay switching circuit and a switched circuit, a switched circuit being connected to the headlight-parking light system and to the windshield wipers, wherein the headlight-parking light system and windshield wipers are activated in accordance with a Truth Table, Table III.

20. The system of claim 19, and a voltage regulator connected to said electronic switching means.

21. The system of claim 19, in which the digital logic circuit is a PROM.

22. The system of claim 19, in which the digital logic circuit is a PLA.

23. The system of claim 19, in which the electronic switching means for the outputs is a high side driver and the relay is a power MOSFET.

24. The system of claim 23, in which the digital circuit is a PROM.

25. The system of claim 23, in which the digital logic circuit is a PLA.

* * * * *